(12) United States Patent
Muto et al.

(10) Patent No.: US 9,061,721 B2
(45) Date of Patent: Jun. 23, 2015

(54) INVERTED PENDULUM TYPE VEHICLE

(71) Applicant: HONDA MOTOR CO., LTD., Tokyo (JP)

(72) Inventors: Yusuke Muto, Wako (JP); Wataru Yada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/273,075

(22) Filed: May 8, 2014

(65) Prior Publication Data

US 2014/0353941 A1 Dec. 4, 2014

(30) Foreign Application Priority Data

May 31, 2013 (JP) ................................. 2013-115729

(51) Int. Cl.
*B62H 1/02* (2006.01)
*B62K 3/00* (2006.01)

(52) U.S. Cl.
CPC . *B62H 1/02* (2013.01); *B62K 3/007* (2013.01)

(58) Field of Classification Search
CPC ..... B62J 25/00; Y10T 74/20918; B62K 1/00; B62K 3/007; B62H 1/02
See application file for complete search history.

(56) References Cited

U.S. PATENT DOCUMENTS

| | | | |
|---|---|---|---|
| 8,050,837 B2 | 11/2011 | Yamada | |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 * | 9/2013 | Gomi et al. | ...................... 180/21 |
| 8,583,302 B2 | 11/2013 | Akimoto et al. | |
| 8,751,110 B2 | 6/2014 | Takenaka et al. | |
| 8,758,191 B2 | 6/2014 | Takenaka et al. | |

(Continued)

FOREIGN PATENT DOCUMENTS

| | | |
|---|---|---|
| DE | 20 2007 007 673 U1 | 10/2007 |
| EP | 1 529 556 A2 | 5/2005 |

(Continued)

OTHER PUBLICATIONS

Al-Hadithi et al., "Fuzzy Optimal Control for Double Inverted Pendulum", 7th IEEE Conference on Industrial Electronics and Applications (ICIEA), 2012, pp. 1-5.

(Continued)

*Primary Examiner* — Kevin Hurley
(74) *Attorney, Agent, or Firm* — Birch, Stewart, Kolasch & Birch, LLP

(57) ABSTRACT

An inverted pendulum type vehicle includes a vehicle body frame having a footstep on which for positioning a rider's feet, a main wheel subjected to an inverted pendulum control, and stand arms pivotally mounted between a standing position and a housing position for supporting the vehicle body frame in a standing state when the inverted pendulum control is not being carried out and the stand arms is positioned at the standing position. The inverted pendulum type vehicle has housing levers that are provided on the vehicle body frame for pivoting the stand arms from the standing position to the housing position. The housing levers protrude upward from a footrest surface of the footstep when the stand arms is positioned at the standing position, and pivot the stand arms to the housing position by being pushed down to the side of the footrest surface.

20 Claims, 18 Drawing Sheets

(56) References Cited

U.S. PATENT DOCUMENTS

| | | |
|---|---|---|
| 2005/0126833 A1 | 6/2005 | Takenaka et al. |
| 2007/0084662 A1 | 4/2007 | Oikawa |
| 2010/0038960 A1 | 2/2010 | Takenaka et al. |
| 2010/0070132 A1 | 3/2010 | Doi |
| 2010/0096905 A1 | 4/2010 | Takenaka et al. |
| 2010/0114421 A1 | 5/2010 | Doi |
| 2010/0299044 A1 | 11/2010 | Miyake et al. |
| 2011/0060518 A1 | 3/2011 | Kosaka |
| 2011/0067936 A1 | 3/2011 | Takenaka et al. |
| 2011/0071714 A1 | 3/2011 | Takenaka |
| 2011/0071752 A1 | 3/2011 | Takenaka et al. |
| 2011/0209932 A1 | 9/2011 | Takenaka et al. |
| 2012/0173042 A1 | 7/2012 | Takenaka et al. |
| 2012/0173086 A1 | 7/2012 | Takenaka et al. |
| 2012/0217072 A1* | 8/2012 | Hoffmann et al. .......... 180/21 |

FOREIGN PATENT DOCUMENTS

| | | | |
|---|---|---|---|
| EP | 1 632 428 A1 | 3/2006 | |
| EP | 2 045 180 A1 | 4/2009 | |
| EP | 2 052 924 A1 | 4/2009 | |
| EP | 2 163 467 A1 | 3/2010 | |
| EP | 2 319 750 A1 | 5/2011 | |
| JP | 2004/129435 A | 4/2004 | |
| JP | 4181113 B2 | 1/2008 | |
| JP | 2010-167807 A | 8/2010 | |
| JP | 2010-167808 A | 8/2010 | |
| JP | 2011/063183 A | 3/2011 | |
| JP | 2011-63183 A | 3/2011 | |
| JP | 2011-63241 A | 3/2011 | |
| JP | 2011-63243 A | 3/2011 | |
| JP | 2011-68222 A | 4/2011 | |
| WO | WO 02/30730 A2 | 4/2002 | |
| WO | WO 2008/132778 A1 | 11/2008 | |
| WO | WO 2008/132779 A1 | 11/2008 | |
| WO | WO 2010/113439 A1 | 10/2010 | |
| WO | WO 2011/033575 A1 | 3/2011 | |
| WO | WO2012017335 A1 * | 2/2012 | |

OTHER PUBLICATIONS

Chen, "Analysis and Design of Robust Feedback Control Systems for a Nonlinear Two-Wheel Inverted Pendulum System", 2012 International Symposium on Computer, Consumer and Control, IEEE, 2012, 1 page (abstract only).

Ghorbani et al., "Fault tolerant improvement with chaos synchronization using Fuzzy-PID control", 13th Iranian Conference on Fuzzy Systems (IFSC), IEEE, 2013, 5 pages.

Jiang et al., "High Gain Disturbance Observer and Its Application in Robust Control Attenuation", Proceeding of the IEEE International Conference on Information and Automation, IEEE, Aug. 2013, pp. 230-235.

Lee et al., "Application of Dynamic Inversion with Extended High-Gain Observers to Inverted Pendulum on a Cart", 2013 American Control Conference (ACC), Jun. 17-19, 2013, AACC, 4234-4238.

Phaoharuhansa et al., "Trajectory Tracking for Wheeled Inverted Pendulum Robot using Tilt Angle Control", IEEE, 2013, pp. 4288-4293.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and Its Application", Proceedings of 2014 IEEE International Conference on Mechatronics and Automation, Aug. 3-6, 2014, pp. 1745-1750.

Office Action dated Feb. 24, 2015 issued in co-pending U.S. Appl. No. 14/223,360.

* cited by examiner

INVERTED PENDULUM TYPE VEHICLE

CROSS-REFERENCE TO RELATED APPLICATIONS

The present application claims priority under 35 USC 119 to Japanese Patent Application No. 2013-115729 filed May 31, 2013 the entire contents of which are hereby incorporated by reference.

BACKGROUND OF THE INVENTION

1. Field of the Invention

The present invention relates to an inverted pendulum type vehicle. More specifically, to a technique for keeping the inverted pendulum type vehicle in a standing state in a state in which inverted pendulum control is not carried out.

2. Description of Background Art

An inverted pendulum type vehicle is known that includes a vehicle body frame; a main wheel made by combining a plurality of freely-rotatable driven rollers in such a manner that the rotational axis lines of the driven rollers form an annular shape and left and right drive disks that are rotatably supported by the vehicle body frame in such a manner so as to be substantially concentric with the rotational axis line of the main wheel and to be located on both sides of the main wheel with a plurality of freely-rotatable drive rollers disposed in contact with the driven rollers with a torsional relationship. Drive means is provided that individually drives the left and right drive disks. See, for example, Japanese Patent Laid-Open No. 2011-63243.

The inverted pendulum type vehicle according to Japanese Patent Laid-Open No. 2011-63243 has steps each composed of a step base part that is provided so as to protrude at the lower side part of a cover serving as a vehicle body outer shell and a step tip part supported by the step base part pivotally around an axis line extending along the front-rear direction. The step tip part can pivot between a first pivotal position at which the step tip part horizontally extends and a second pivotal position at which the tip thereof extends downward. At the first pivotal position, the step tip part forms a footstep that supports a sole of a rider in cooperation with the step base part. On the other hand, the tip of the step tip part can abut against a floor surface at the second pivotal position. Therefore, when the inverted pendulum control is deactivated and the inverted pendulum type vehicle is parked, the step tip parts function as stands and can keep the inverted pendulum type vehicle in a predetermined standing state.

In the inverted pendulum type vehicle according to Japanese Patent Laid-Open No. 2011-63243, in order to avoid unintentional rotation of the step tip part to the second pivotal position when a rider is riding the vehicle, the rotational angle from the first pivotal position to the second pivotal position is set to about 270° and the step tip part is configured so as to be pushed to the first pivotal position side by putting of a foot on the step. Therefore, when the steps are desired to be used as the stands, the step tip parts need to be rotated about 270° from the first pivotal position to the second pivotal position. Thus, operating them with a foot is difficult.

SUMMARY AND OBJECTS OF THE INVENTION

The present invention is made in view of the above circumstances and an object thereof is to facilitate the operation of stands in an inverted pendulum type vehicle.

In order to achieve the above-described object, according to an embodiment of the present invention an inverted pendulum type vehicle (1) is provided having a vehicle body frame (2) including a step (101) on which to place the feet of a rider, a main wheel (3) that is provided on the vehicle body frame and is subjected to control by the inverted pendulum, and a stand (116) that is provided on the vehicle body frame pivotally between a standing position and a housing position for supporting the vehicle body frame in a standing state when the inverted pendulum control is not being carried out and the stand exists in the standing position. The inverted pendulum type vehicle includes a housing lever (118) that is provided on the vehicle body frame and pivots the stand from the standing position to the housing position. Furthermore, the housing lever protrudes upwardly from a footrest surface (108) of the step when the stand exists at the standing position, and pivots the stand to the housing position by being pushed down to the side of the footrest surface.

According to an embodiment of the present invention, the stand can be displaced from the standing position to the housing position by pushing down the housing lever. This allows the rider to change the stand position by simple operation of depressing the housing lever with a foot. In particular, because the housing lever protrudes upwardly from the footrest surface of the step when the stand exists at the standing position, it is easy for the rider to perform the depression operation of the housing lever.

According to an embodiment of the present invention, it is preferable that the inverted pendulum type vehicle further has a standing lever (117) that is provided on the vehicle body frame and pivots the stand from the housing position to the standing position and the standing lever is disposed closer to the inside in a vehicle width direction than the footrest surface of the step.

According to an embodiment of the present invention, the rider can pivot the stand from the housing position to the standing position by operating the standing lever. Because the standing lever is disposed closer to the inside in the vehicle width direction than the part that supports the feet of the rider on the step, the rider is prevented from unintentionally operating the standing lever when riding the vehicle.

According to an embodiment of the present invention, it is preferable that the standing lever pivots the stand from the housing position to the standing position by being pushed down to a position lower than the footrest surface.

According to an embodiment of the present invention, the operation of pushing down the standing lever to a position lower than the footrest surface is necessary to pivot the stand from the housing position to the standing position. Therefore, the stand is not operated only by placing an individual's feet on the footrest surface. This prevents an unintentional operation of the standing lever.

According to an embodiment of the present invention, the following configuration is preferable. The vehicle body frame has an axle support member (26) that supports an axle (25) of the main wheel. Furthermore, the step is supported by the axle support member and extends from left and right side parts of the main wheel to the front side of the main wheel with the stand being pivotally supported by a front end part (105) of the step.

According to an embodiment of the present invention, because the stand is supported by the step, an additional structure for allowing the stand to be supported by a structural body of the inverted pendulum type vehicle does not need to be provided, which can reduce the number of parts. The step is formed with comparatively high rigidity so as to be capable of supporting the feet of the rider and therefore is suitable as a structural body to support the stand. Furthermore, the subassembly of the stand and the step is permitted, which facilitates assembling to the inverted pendulum type vehicle.

In the above-described invention, it is preferable that the standing lever and the housing lever are pivotally supported by the step.

According to an embodiment of the present invention, the standing lever and the housing lever can be formed as a subassembly assembled to the step.

In the above-described invention, it is preferable that the housing levers are disposed on the left and right lateral sides of the main wheel and the standing lever is disposed in front of the main wheel.

According to an embodiment of the present invention, because the standing lever is disposed in front of the main wheel, i.e. at a place on which a foot is not normally positioned, the unintentional operation of the standing lever is prevented.

In the above-described invention, it is preferable that the standing lever has a surface flush with the footrest surface when the stand exists at the housing position and the housing lever has a surface flush with the footrest surface when the stand exists at the housing position.

According to an embodiment of the present invention, the standing lever and the housing lever are disposed so as to be flush with the footrest surface in a state wherein the stand exists at the housing position, i.e. the state in which the rider can ride the inverted pendulum type vehicle. Therefore, the standing lever and the housing lever do not diminish the range in which feet can be positioned on the step. More specifically, when an individual's feet are placed on the step, the standing lever and the housing lever do not get in the way of the feet.

In the above-described invention, the following configuration is preferable. The inverted pendulum type vehicle has a position sensor (172) for detecting the displacement position of at least one of the stand, the standing lever, and the housing lever. Furthermore, the position of the stand is detected based on a signal from the position sensor and the inverted pendulum control is inhibited when the stand exists in the standing position.

According to an embodiment of the present invention, the inverted pendulum control is not carried out when the stand exists in the standing position. Because the inverted pendulum control is to keep the inclination of the vehicle body frame by controlling the main wheel, the control is often not properly carried out if a structural body that restricts the inclination of the vehicle body frame comes into contact with the floor surface. Therefore, by inhibiting the inverted pendulum control when the stand exists in the standing position and possibly comes into contact with the floor surface, an unexpected control can be prevented and the safety can be further enhanced.

According to the above-described configurations, the operation of a stand can be facilitated in an inverted pendulum type vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the inverted pendulum type vehicle of the present invention will be described below with reference to the drawings. In the following description, the respective directions are defined on the basis of the rider (person on board) sitting on the inverted pendulum type vehicle.

Figure 1:
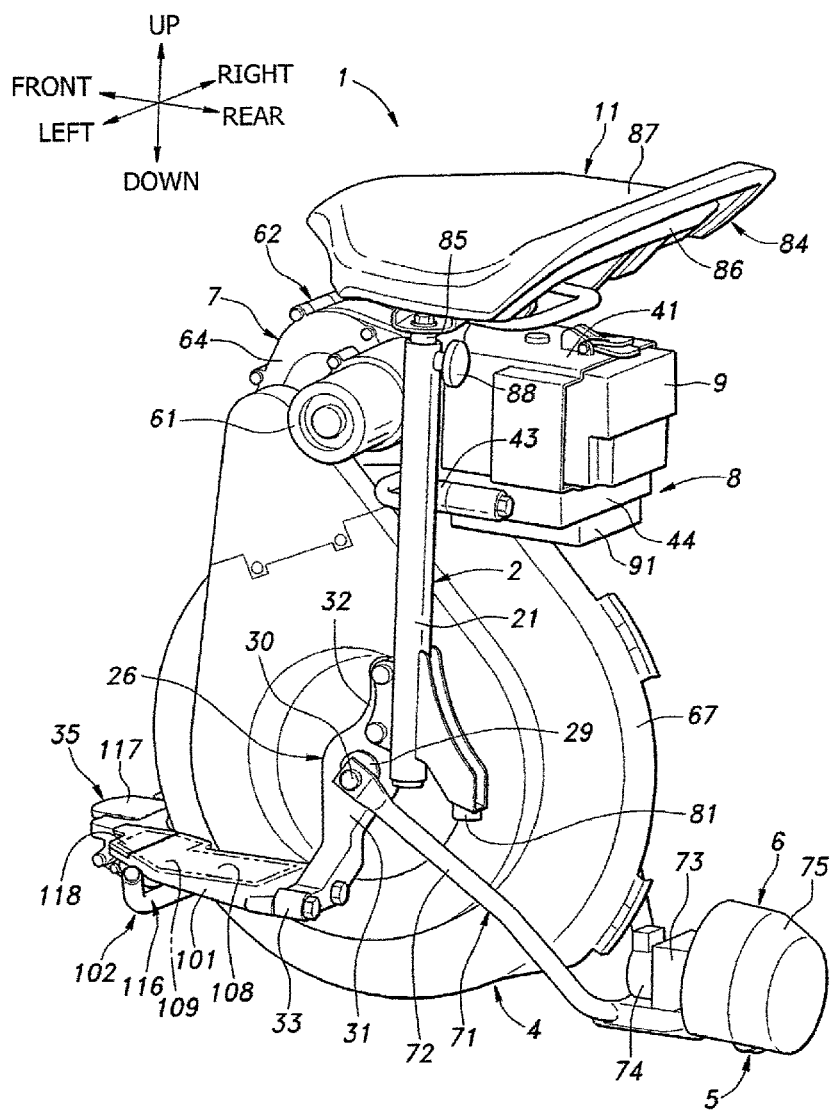
FIG. 1 is a perspective view of an inverted pendulum type vehicle according to an embodiment.
Figure 2:
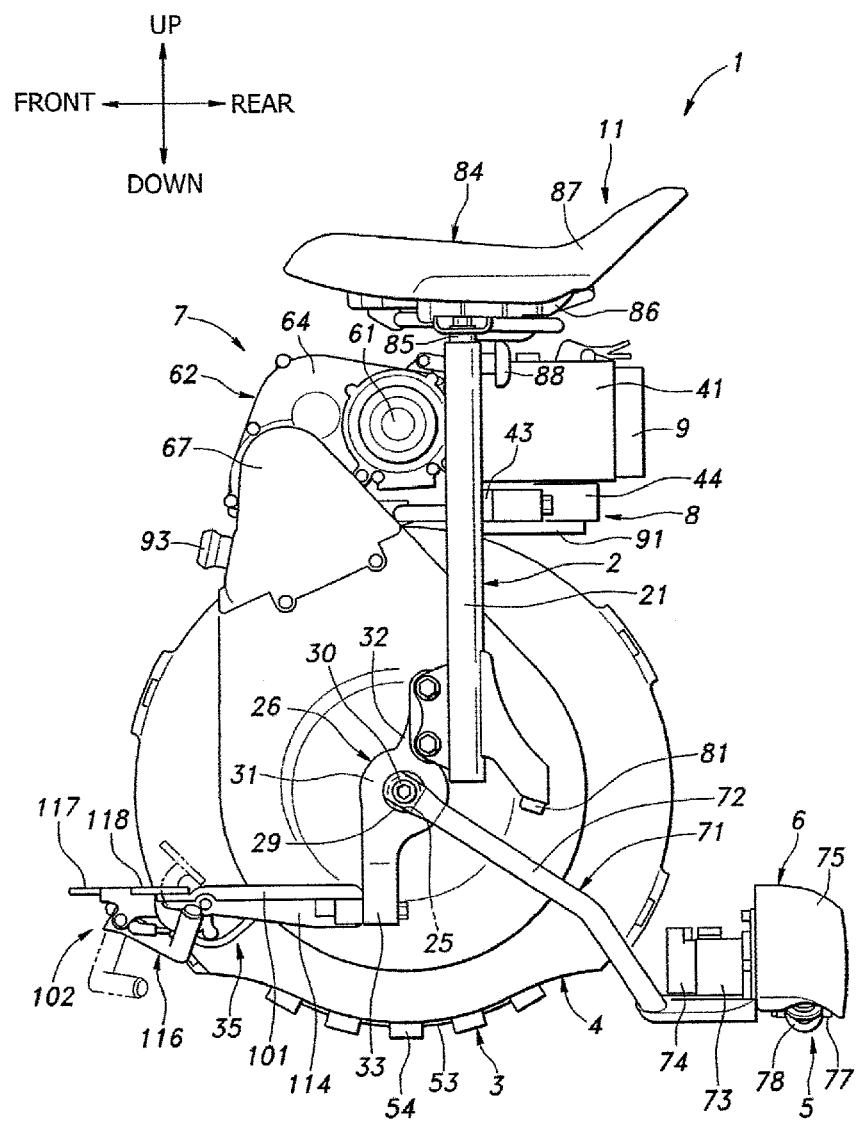
FIG. 2 is a side view of the inverted pendulum type vehicle.
Figure 3:
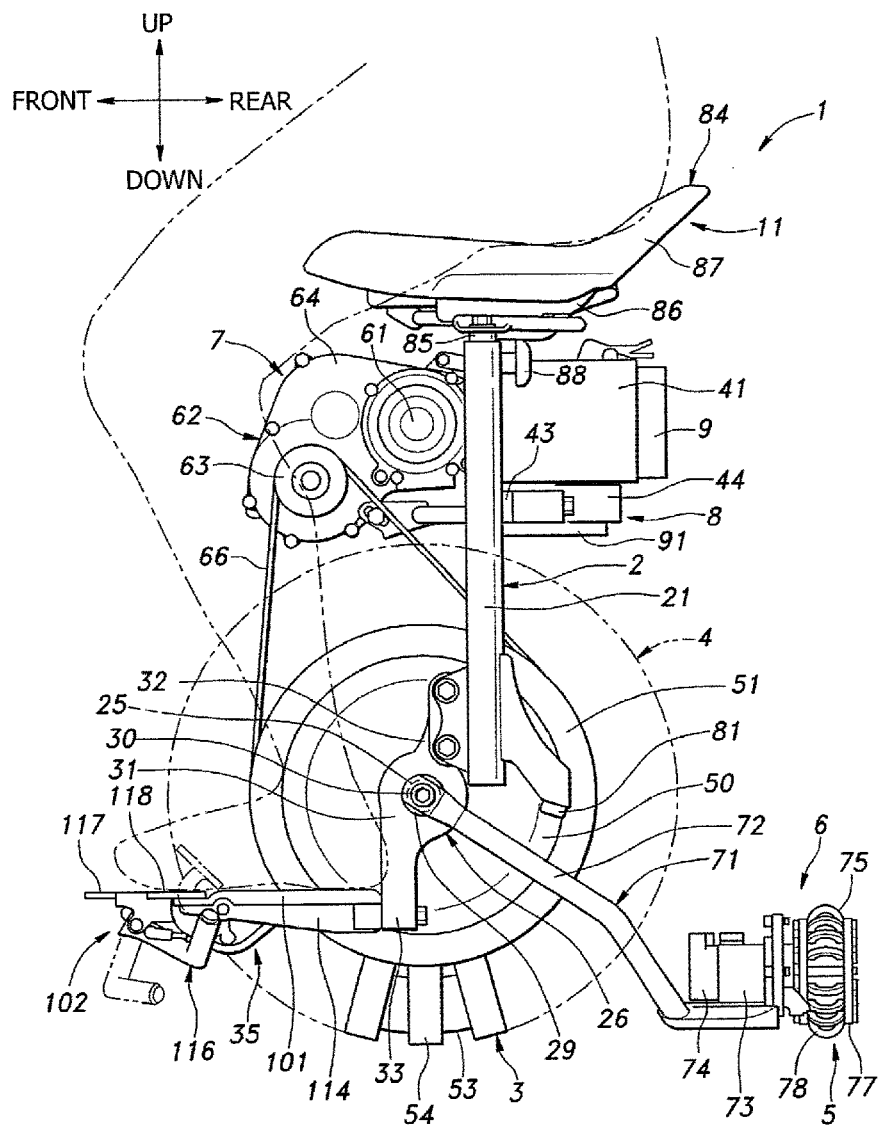
FIG. 3 is a side view of the inverted pendulum type vehicle in a state wherein a wheel cover is removed.
Figure 4:
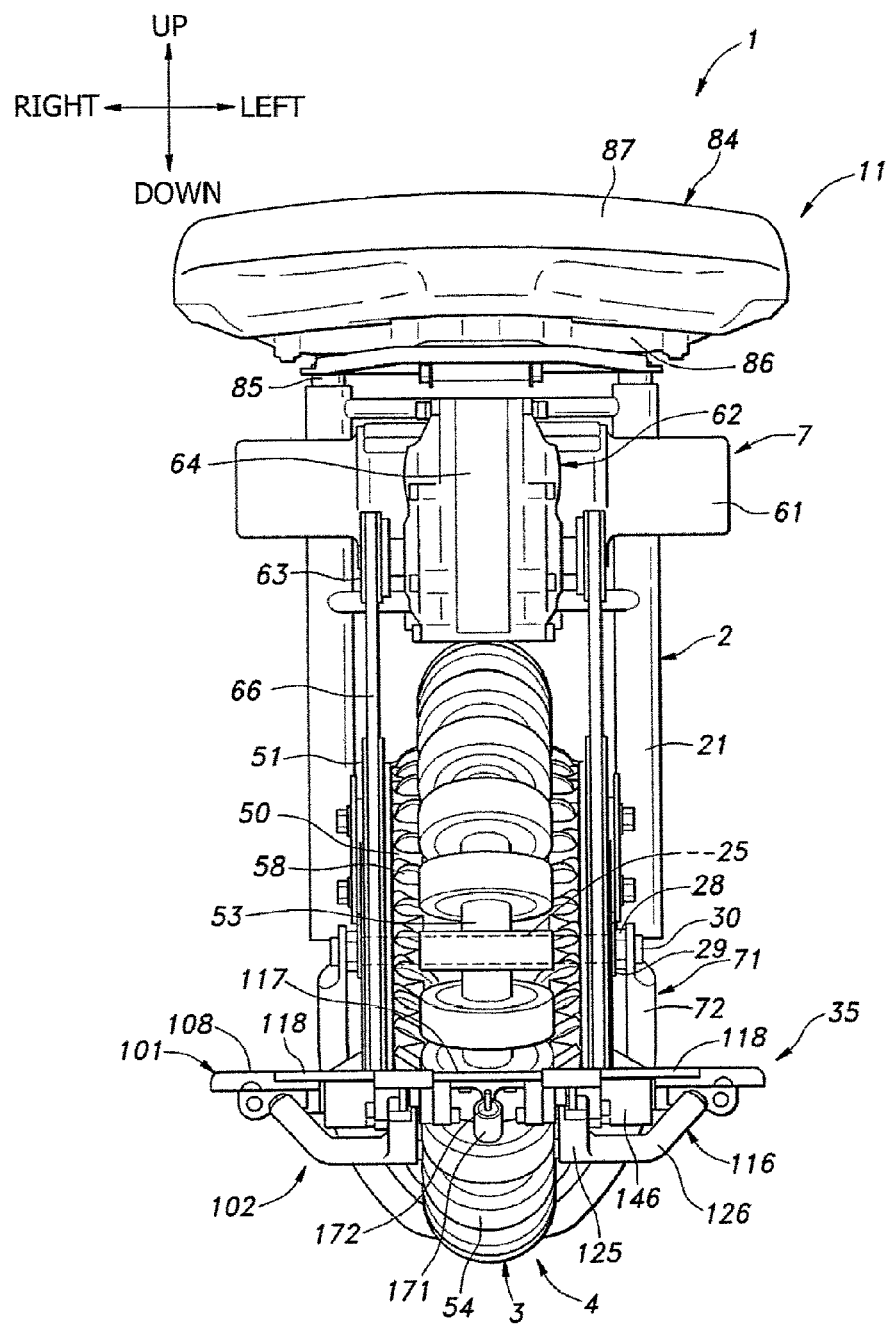
FIG. 4 is a front view of the inverted pendulum type vehicle in a state wherein a step unit is in the housed state and the wheel cover is removed.

FIG. 1 is a perspective view of the inverted pendulum type vehicle according to the embodiment. FIG. 2 is a side view of the inverted pendulum type vehicle. FIG. 3 is a side view of the inverted pendulum type vehicle in the state wherein a wheel cover is removed. FIG. 4 is a front view of the inverted pendulum type vehicle in the state wherein a step unit is in the housed state and the wheel cover is removed. As shown in FIGS. 1 to 4, an inverted pendulum type vehicle 1 has the following components a vehicle body frame 2 forming the vehicle body framework; a main wheel unit 4 including a main wheel 3; a tail wheel unit 6 including a tail wheel 5; a drive unit 7 for driving the main wheel unit 4; an electric equipment unit 8 for controlling the drive unit 7 and the tail wheel unit 6; a battery pack 9 for supplying power to the electric equipment unit 8; and a saddle unit 11 for a rider to sit on.

Figure 5:
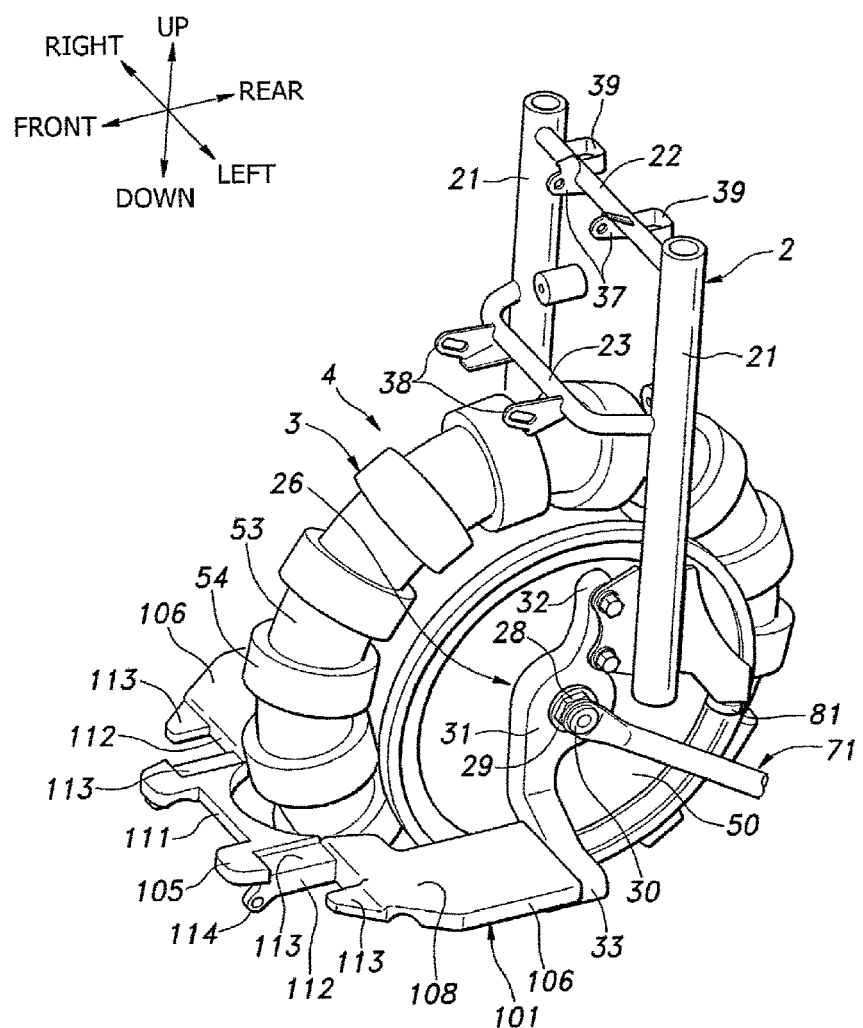
FIG. 5 is a perspective view of a vehicle body frame.

FIG. 5 is a perspective view of the vehicle body frame. As shown in FIGS. 1 to 5, the vehicle body frame 2 has a pair of left and right side posts 21 that extend vertically with an upper beam 22 and a middle beam 23 that extend along the left-right direction for connecting the left and right side posts 21 to each other. The upper beam 22 extends in a straight line manner with both the left and right ends thereof being joined to the upper end parts of the left and right side posts 21. The middle beam 23 is disposed downward of the upper beam 22 and both the left and right ends thereof are joined to intermediate parts of the left and right side posts 21. The middle beam 23 is formed in a curved manner so that its intermediate part in the longitudinal direction may protrude forward of both the left and right ends. The side posts 21, the upper beam 22, and the middle beam 23 are formed from steel pipe materials and are joined to each other by bolt fastening or welding. Hereinafter, the term "join" includes publicly-known joining techniques such as bolt fastening and welding unless a limitation is specifically stated. In other embodiments, the side posts 21, the upper beam 22, and the middle beam 23 may be formed from a publicly-known material such as a pressed steel plate.

Mount members (axle support members) 26 supported by an axle 25 of the main wheel unit 4 are joined to the lower end parts of the left and right side posts 21, respectively. The mount members 26 each have a mount base part 31 in which an axle hole (not shown) is formed, a post-joined part 32 that extends upwardly from the mount base part 31, and a step joined part 33 extending downwardly from the mount base part 31. The post-joined parts 32 are joined to the lower end parts of the respective side posts 21. The left and right axle holes are each formed so as to penetrate along the left-right direction and are disposed coaxially with each other. The inner diameter of the axle holes is set smaller than the outer diameter of the axle 25. Axle fastening bolts 28 are inserted into the axle holes (see FIG. 4). The shaft part of the axle fastening bolt 28 penetrates through a washer 29 and the axle hole from the outside in the left-right direction and screws to the end part of the axle 25, fastening the axle 25 to the mount member 26 non-rotatably. After extending downwardly from the mount base part 31, the left and right step joined parts 33 extend in such a direction so as to get away from each other in the left-right direction. A step unit 35 to be described later is spanned between the lower ends of the left and right step joined parts 33.

To the upper beam 22, a pair of left and right first brackets 37 are joined so as to protrude forward. To the middle beam 23, a pair of left and right second brackets 38 are so joined as to protrude forward. The drive unit 7 is fastened to the first and second brackets 37 and 38 by bolts and is disposed on the front side of the upper parts of the left and right side posts 21.

To the upper beam 22, a pair of left and right third brackets 39 are joined so as to protrude rearwardly. A battery case 41 for supporting the battery pack 9 is joined to the third brackets 39 and is disposed on the rear side of the upper parts of the left and right side posts 21. The battery case 41 is formed into a box shape opened rearwardly and internally has a connector (not shown) for connection with the battery pack 9. The battery pack 9 is inserted from the rear side into the battery case 41 to thereby be supported by the battery case 41 and connected to the connector.

Electric equipment unit joining parts 43 as bolt bosses are provided at vertically intermediate parts of the left and right side posts 21. An electric equipment case 44 serving as an outer shell of the electric equipment unit 8 is fastened to the electric equipment unit joining parts 43 by bolts and is disposed directly beneath the battery case 41, i.e. on the rear side of the upper parts of the side posts 21.

As shown in FIG. 4, the main wheel unit 4 is disposed between the left and right mount members 26 and between the left and right side posts 21. The main wheel unit 4 includes the following components the axle 25 horizontally extending along the vehicle width direction (left-right direction); left and right drive disks 50 supported on the outer circumference of the axle 25 rotatably independently of each other; the annular main wheel 3 through which the axle 25 is inserted and that is disposed between the left and right drive disks 50; and left and right driven pulleys 51 for cog belts joined to the left and right drive disks 50. The left and right drive disks 50 and the left and right driven pulleys 51 all have the axis line of the axle 25 as a common axis line and exist on the same axis line. On the outer circumference of the axle 25, a pair of left and right step parts (not shown) are formed at a predetermined interval in the axis line direction. The left and right drive disks 50 are each held between a nut (not shown) screwed to the axle 25 and the step part, so that the positions thereof in the axis line direction of the axle 25 are settled.

The main wheel 3 is a drive wheel driven based on an inverted pendulum control. It is composed of an annular member 53 made of a metal with a plurality of driven rollers 54 (free rollers) attached to the outer circumference of the annular member 53 for coming into contact with the ground at the driven roller 54. The driven roller 54 is composed of a cylindrical base part (reference numeral is omitted) that is rotatably mounted on the outer circumference of the annular member 53 and is made of a metal and a cylindrical outer circumferential part (reference numeral is omitted) that is bonded to the outer circumference of the base part by cure adhesion and is made of rubber. A plurality of driven rollers 54 are provided in the annular direction (circumferential direction) of the annular member 53 and are each capable of individually rotating (spinning) with the rotation center being the tangent to the annular member 53 at the placement position of the driven roller 54. More specifically, the main wheel 3 is made by combining the plurality of driven rollers 54 capable of independently spinning in such a manner that they form a circular ring. Strictly speaking, the plurality of driven rollers 54 form the main wheel 3 by being combined so as to form a polygonal shape having the number of corners according to the number of driven rollers 54.

The left and right drive disks 50 form a circular disk shape having an outer diameter smaller than the center radius of the annular member 53 and the outer circumferential part thereof forms a substantially conical trapezoidal shape. On the outer circumferential part of the drive disk 50, a plurality of drive rollers 58 made of a metal are rotatably supported at equal intervals in the circumferential direction. The drive rollers 58 on the left drive disk 50 and the drive rollers 58 on the right drive disk 50 are disposed so as to form a symmetrical shape in the left-right direction, and the rotation center of each drive roller 58 is disposed so as to have a torsional relationship with the rotational center of the drive disk 50. Due to this, the left and right drive rollers 58 form a symmetrical shape in the left-right direction and have an inclined placement similar to that of the tooth trace of a helical gear.

The left and right drive disks 50 are disposed so as to sandwich the main wheel 3 from both the left and right sides and support the main wheel 3 on substantially the same axis line (concentrically). This allows the main wheel 3 to be supported between the left and right drive disks 50.

The outer circumferential part of the drive roller 58 of the drive disk 50 is in contact with the outer circumferential part of the driven roller 54 of the main wheel 3 in a state of being pressed against it. The drive rollers 58 of the left and right drive disks 50 sandwich the driven rollers 54 from both the left and right sides. This allows the main wheel 3 to be supported in a no-shaft state between the left and right drive disks 50 and rotate (revolve) around its own center together with the left and right drive disks 50. In the above-described manner, the assembly as the main wheel unit 4 made with the left and right drive disks 50, the left and right driven pulleys 51, the axle 25, and the main wheel 3 is formed. The main wheel unit 4 is disposed between the left and right mount members 26 and is fastened to the inside of the mount members 26 by the axle fastening bolts 28, which each penetrate through the washer 29 and the axle hole to be joined to the end part of the axle 25. The head parts of the axle fastening bolts 28 protrude from the mount members 26 outwardly in the left-right direction.

The drive unit 7 has a pair of left and right electric motors 61, a reduction mechanism 62, and a pair of left and right drive pulleys 63 for cog belts. The reduction mechanism 62 has one gear case 64, a gear train (not shown) for the left electric motor 61 supported in the gear case 64, and a gear train (not shown) for the right electric motor 61 supported in the gear case 64. The left and right electric motors 61 are joined to the left and right side parts of the gear case 64 in such a manner that their rotation axes are coaxial with each other across the gear case 64. The respective output shafts (not shown) of the two gear trains in the reduction mechanism 62 protrude from the left and right side parts of the gear case 64 coaxially with each other. The output shafts of the respective gear trains are disposed parallel to the rotational axis of the left and right electric motors 61. The output shaft of the gear train corresponding to the left electric motor 61 protrudes to the left side and the output shaft of the gear train corresponding to the right electric motor 61 protrudes to the right side. The drive pulleys 63 are joined to the output shafts of the respective gear trains.

The gear case 64 is fastened to the first brackets 37 and the second brackets 38 by bolts and thereby the drive unit 7 is supported by the vehicle body frame 2. In the state of being supported by the vehicle body frame 2, the drive unit 7 is disposed in front of the upper parts of the left and right side posts 21 and is disposed upwardly of the front part of the main wheel unit 4. The left and right electric motors 61 are disposed in front of the left and right side posts 21 and protrude to the left and right outside beyond the left and right side posts 21. The left and right drive pulleys 63 are disposed forwardly and downwardly of the left and right electric motors 61 and are disposed above the left and right driven pulleys 51. An endless cog belt 66 is spanned between the drive pulley 63 and the driven pulley 51 corresponding to each other on the left or right side. The drive pulley 63 is set so as to have a smaller diameter and a smaller number of teeth than the driven pulley 51. Due to this, the rotational force of the left electric motor 61 is transmitted to the left drive disk 50 via the left gear train of the reduction mechanism 62, the left drive pulley 63, the cog belt 66, and the left driven pulley 51. Similarly, the rotational force of the right electric motor 61 is transmitted to the right drive disk 50 via the right gear train of the reduction mechanism 62, the right drive pulley 63, the cog belt 66, and the right driven pulley 51.

A wheel cover 67 made of a synthetic resin is provided so as to cover the main wheel 3, the left and right drive disks 50, the left and right driven pulleys 51, the left and right drive pulleys 63, and the cog belts 66. The lower part of the wheel cover 67 has an opening and the lower part of the main wheel 3 is exposed to the outside.

The tail wheel unit 6 is supported by the axle 25 with the intermediary of a tail wheel arm 71. The tail wheel arm 71 extends along the front-rear direction. The rear end part thereof extends in a substantially straight line manner whereas the front end part is made as a fork part 72 arising from bifurcation into left and right branches. The main wheel unit 4 (left and right drive disks 50 and main wheel 3), the wheel cover 67, and the left and right mount members 26 are disposed in the middle of the fork part 72 and the tip parts of the fork part 72 (front end part) are pivotally supported by pivot shafts 30 coaxially joined to the axle fastening bolts 28. This allows the tail wheel arm 71 to extend to the rear side of the main wheel 3 without interfering with the main wheel 3, the left and right drive disks 50, and the wheel cover 67.

The tail wheel unit 6 is supported at the rear end of the tail wheel arm 71. The tail wheel unit 6 has the following components the tail wheel 5 supported rotatably relative to the tail wheel arm 71; an electric motor 73 that rotationally drives the tail wheel 5; a rotational angle sensor 74 for detecting the rotational angle of the electric motor 73; and a tail wheel cover 75 for covering the tail wheel 5. Because the tail wheel arm 71 is supported rotatably around the axis line of the axle 25, the tail wheel 5 of the tail wheel unit 6 comes into contact with the ground by its own weight.

The tail wheel 5 is an omni-wheel composed of a wheel 77 that is supported rotatably relative to the tail wheel arm 71 and has a circular plate shape and a plurality of free rollers 78 spinnably attached to the outer circumferential part of the wheel 77. The free rollers 78 can each rotate with the rotation axis line being the tangent to the wheel 77 at the position where the free roller 78 is provided. The tail wheel 5 comes into contact with the ground at the free roller 78. In a state wherein the tail wheel 5 is in contact with the ground, the rotational axis of the electric motor 73, i.e. the rotational axis line of the wheel 77, extends along the front-rear direction. More specifically, the wheel 77 rotates around an axis line perpendicular to the axis line of the axle 25 (rotational center axis line of the main wheel 3) in a plan view.

Stoppers 81 protruding rearwardly and downwardly are attached to the left and right side posts 21. The stoppers 81 abut against the upper surface of the fork part 72 when the tail wheel arm 71 exists at a predetermined pivot position. This restricts the range of the upward pivot of the tail wheel arm 71 around the axle 25 (range of the pivot of the tail wheel arm 71 in the anticlockwise direction in the state in which the vehicle is viewed from the left (see FIGS. 2 and 3)). In other words, the stoppers 81 set the maximum angle of the rearward inclination of the vehicle body frame 2 (side posts 21).

As shown in FIGS. 1 to 4, the saddle unit 11 has a saddle 84 that supports the hip of the rider and a pair of left and right saddle posts 85 that allow the saddle 84 to be supported on the vehicle body frame 2. The saddle 84 has a plate-shaped base 86 serving as the framework (bottom plate) and a flexible pad 87 attached to the upper part of the base 86. The pair of left and right saddle posts 85 have a columnar shape vertically extending and the upper ends thereof are joined to the lower part of the base 86. The left and right saddle posts 85 are inserted into upper end openings of the left and right side posts 21 and supported by the side posts 21. Near the upper ends of the left and right side posts 21, adjustment screws 88 that penetrate the side posts 21 in the radial direction are screwed. In the left and right saddle posts 85, receptor holes (not shown) that penetrate in the diameter direction and receive the adjustment screw 88 are formed. A plurality of receptor holes are formed along the longitudinal direction of the saddle posts 85. The depth of the insertion of the saddle post 85 into the side post 21 is selected by selection of the receptor hole through which the adjustment screw 88 passes. More specifically, the height of the saddle 84 relative to the side post 21 can be adjusted.

The electric equipment unit 8 has a main wheel PDU, a tail wheel PDU, a DC-DC converter, and an I/O interface, none of which is shown in the diagrams, and a gyro sensor 91. The main wheel PDU is a power drive unit for main wheel control for controlling the drive unit 7 and the tail wheel PDU is a power drive unit for tail wheel control for controlling the tail wheel unit 6. The DC-DC converter steps down a DC voltage supplied from the battery pack 9 to a predetermined DC voltage. The gyro sensor 91 detects the inclination angle and angular velocity of the vehicle body frame 2 with respect to a predetermined axis line (e.g. vertical line). The main wheel PDU, the tail wheel PDU, the DC-DC converter, and the I/O interface are housed in the box-shaped electric equipment case 44 (see FIG. 1).

The electric equipment case 44 is fastened, by bolts, to the electric equipment unit joining parts 43 provided on the left and right side posts 21 and is disposed below the battery case 41 and above the main wheel unit 4. In a side view, most parts of the electric equipment case 44 are disposed rearwardly of the left and right side posts 21. The gyro sensor 91 is joined to the bottom surface of the electric equipment case 44 and is disposed between the electric equipment case 44 and the main wheel unit 4 in the vertical direction. A switch button 93 to turn on and off the power supply of the electric equipment unit 8 is provided on the front surface of the wheel cover 67, i.e. on the front upper side of the main wheel 3. An output signal from the switch button 93 is input to the I/O interface.

Figure 6:
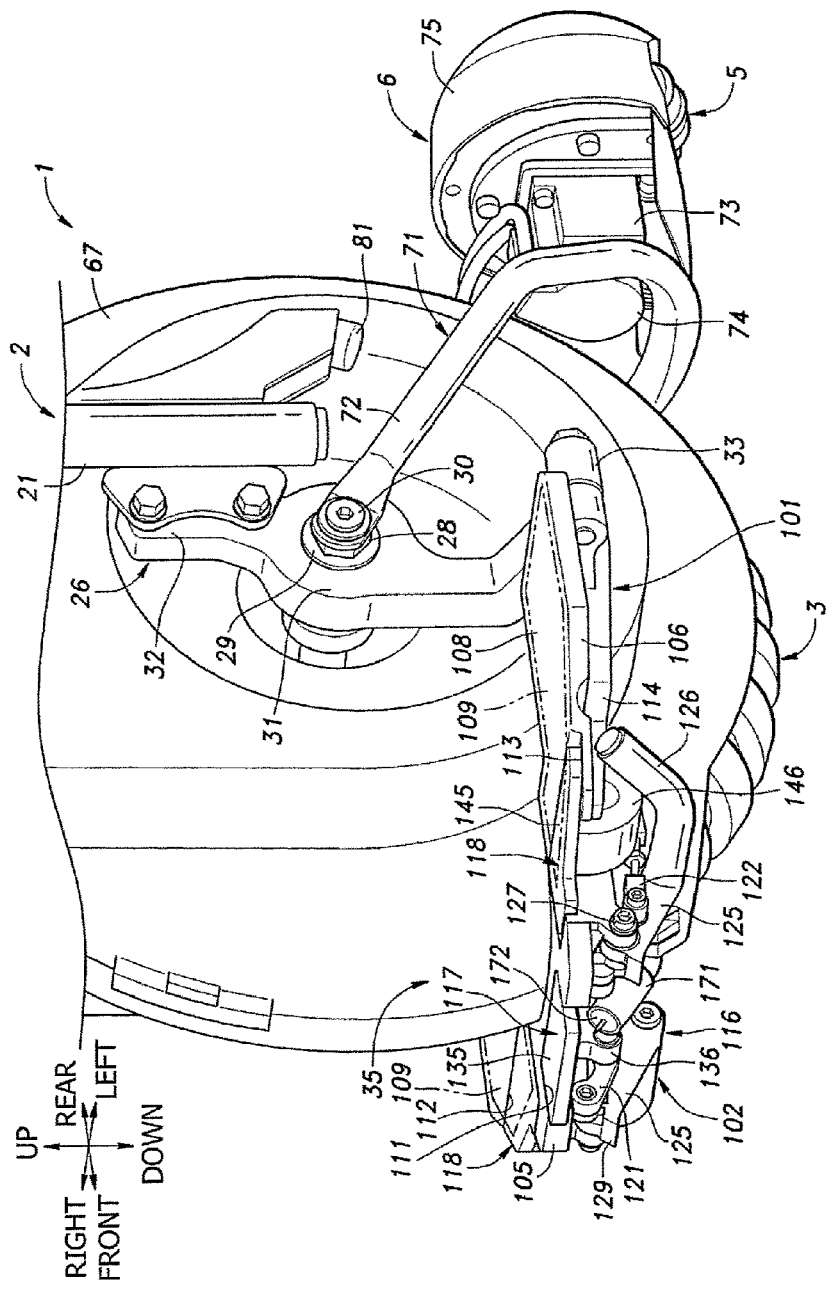
FIG. 6 is a perspective view of the step unit in the housed state.
Figure 7:
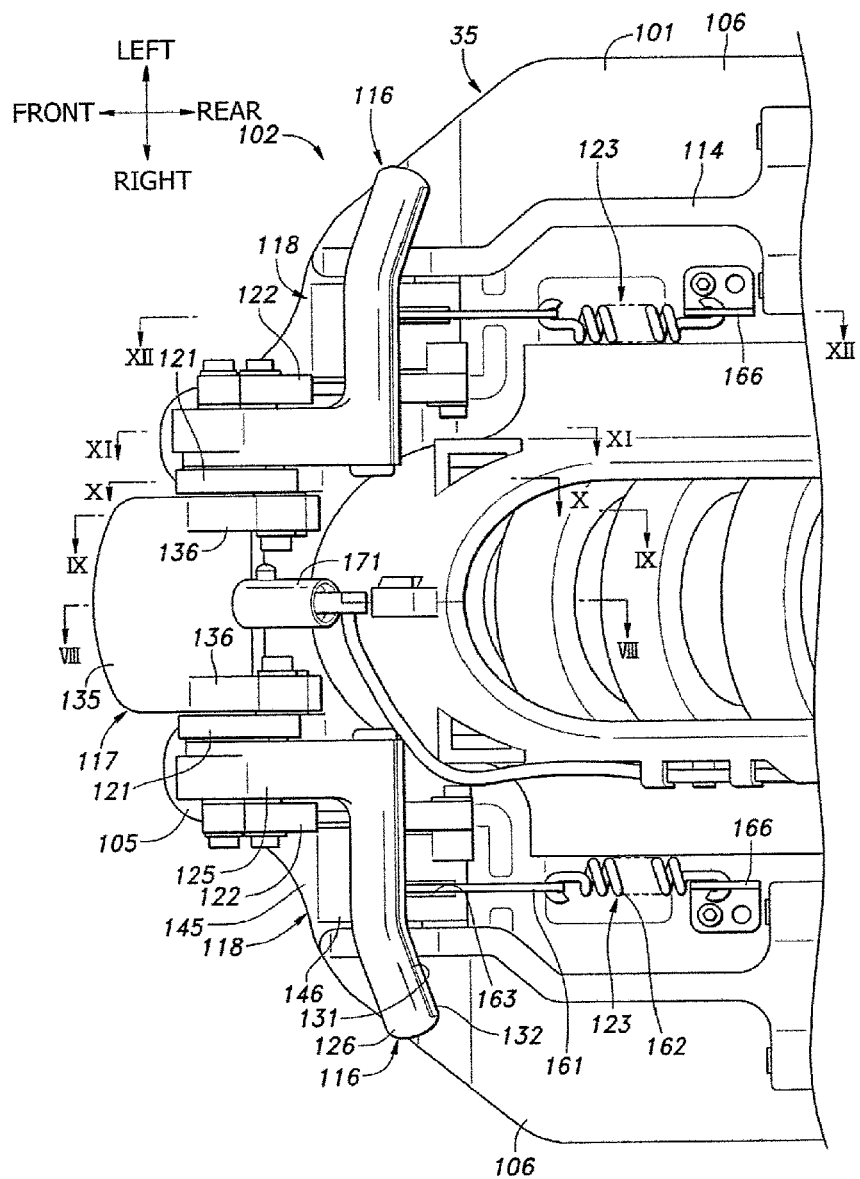
FIG. 7 is a bottom view of the step unit in the housed state.
Figure 12:
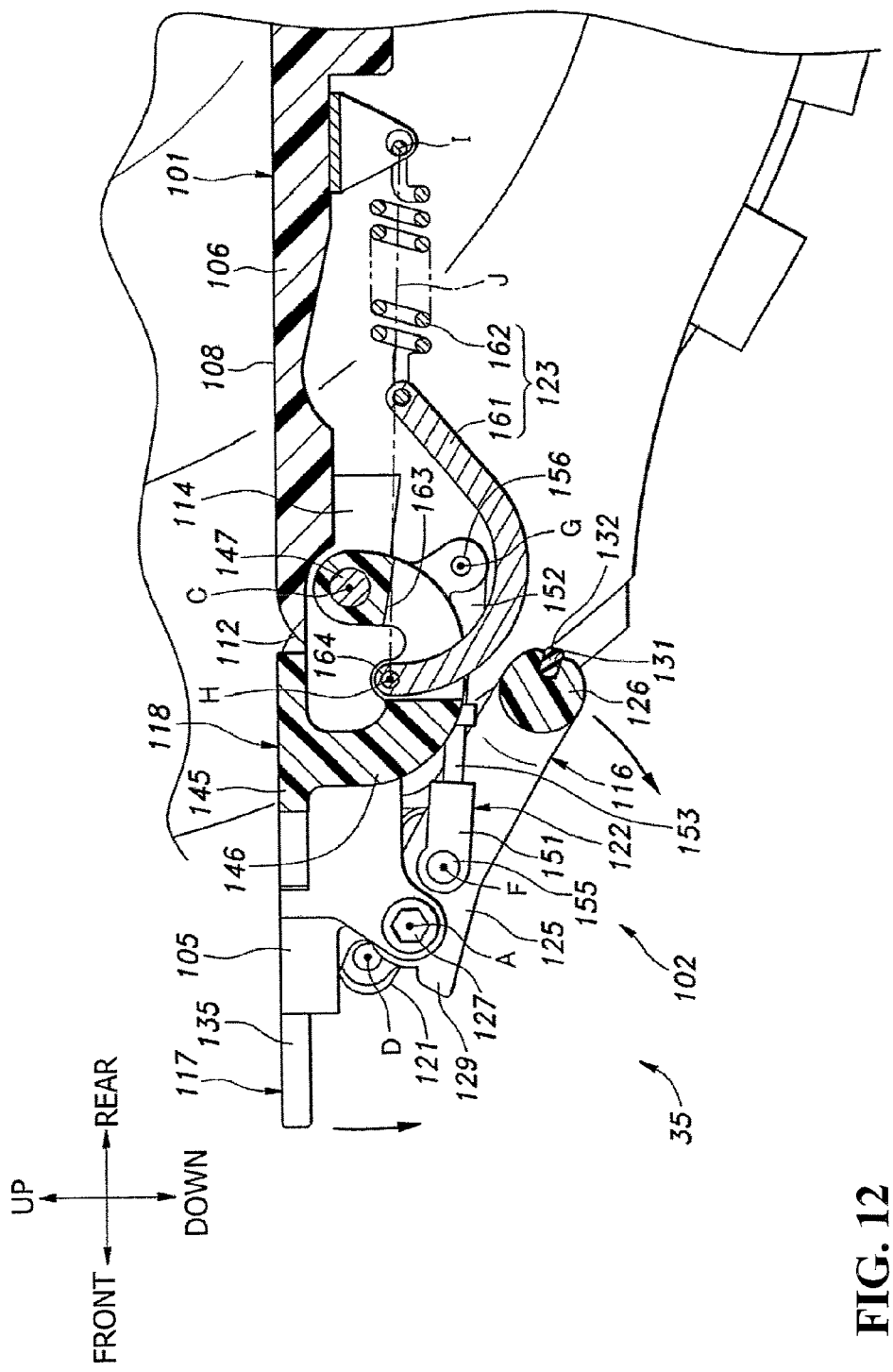
FIG. 12 is a sectional view along line XII-XII in FIG. 7.
Figure 13:
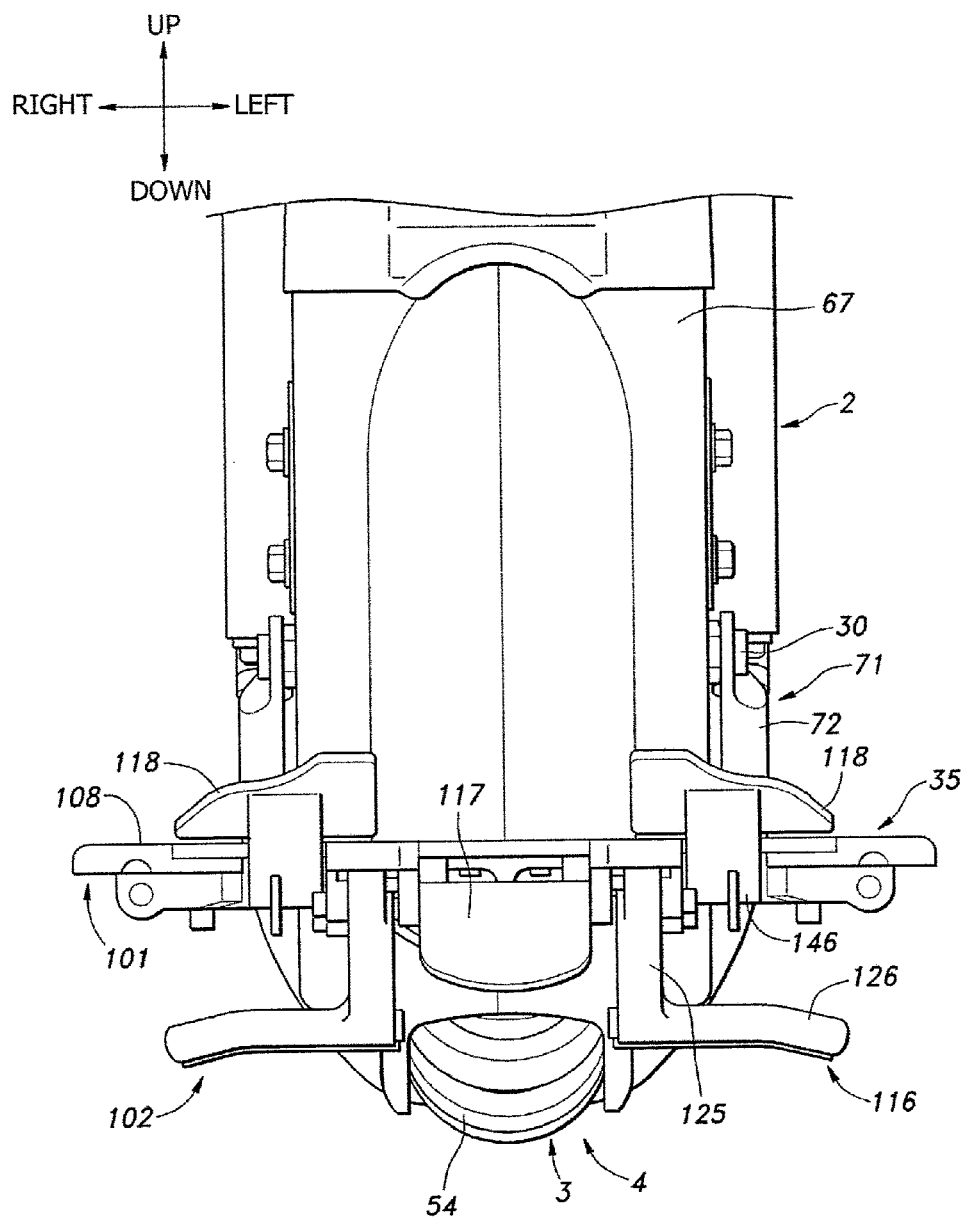
FIG. 13 is a front view of the step unit in a standing state.
Figure 14:
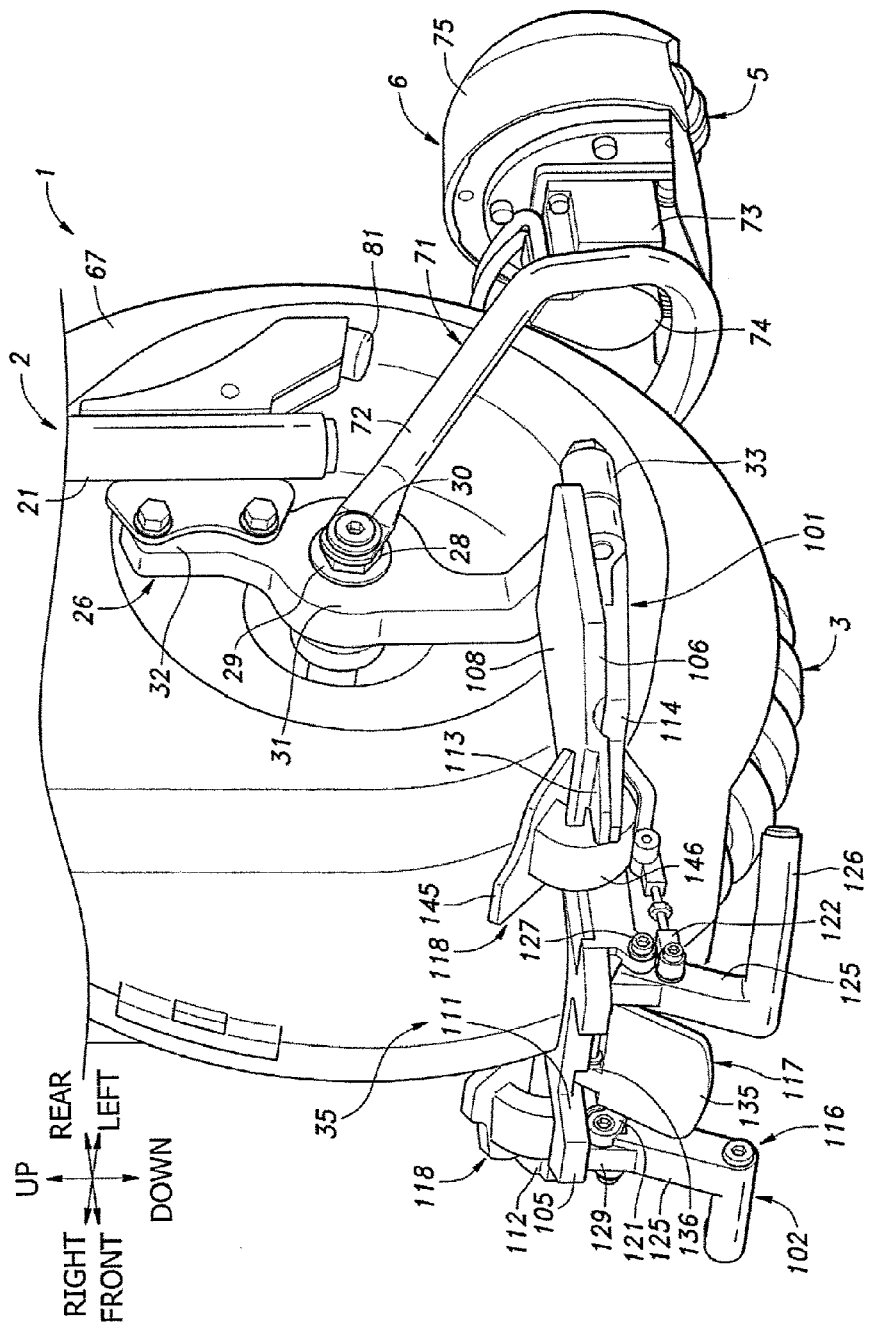
FIG. 14 is a perspective view of the step unit in the standing state.
Figure 15:
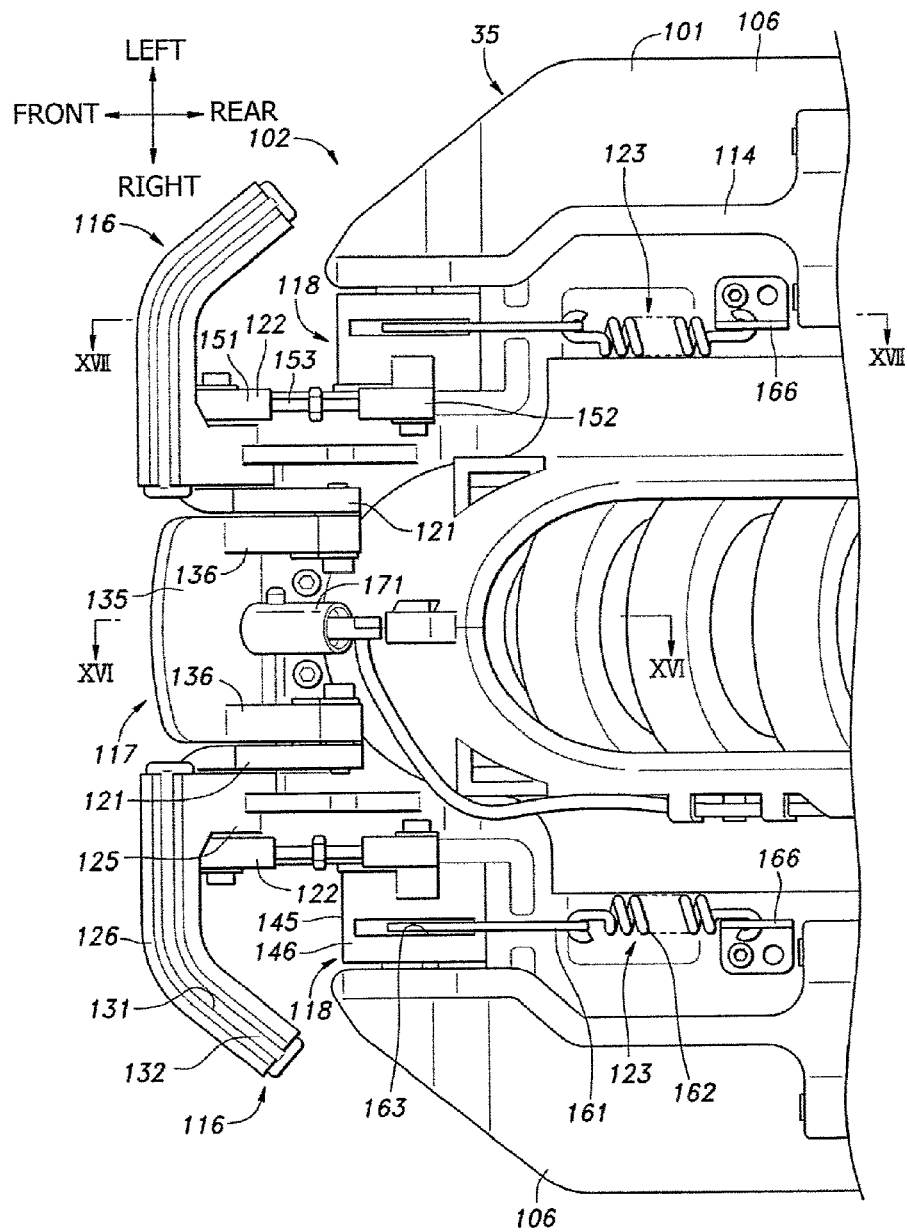
FIG. 15 is a bottom view of the step unit in the standing state.
Figure 16:
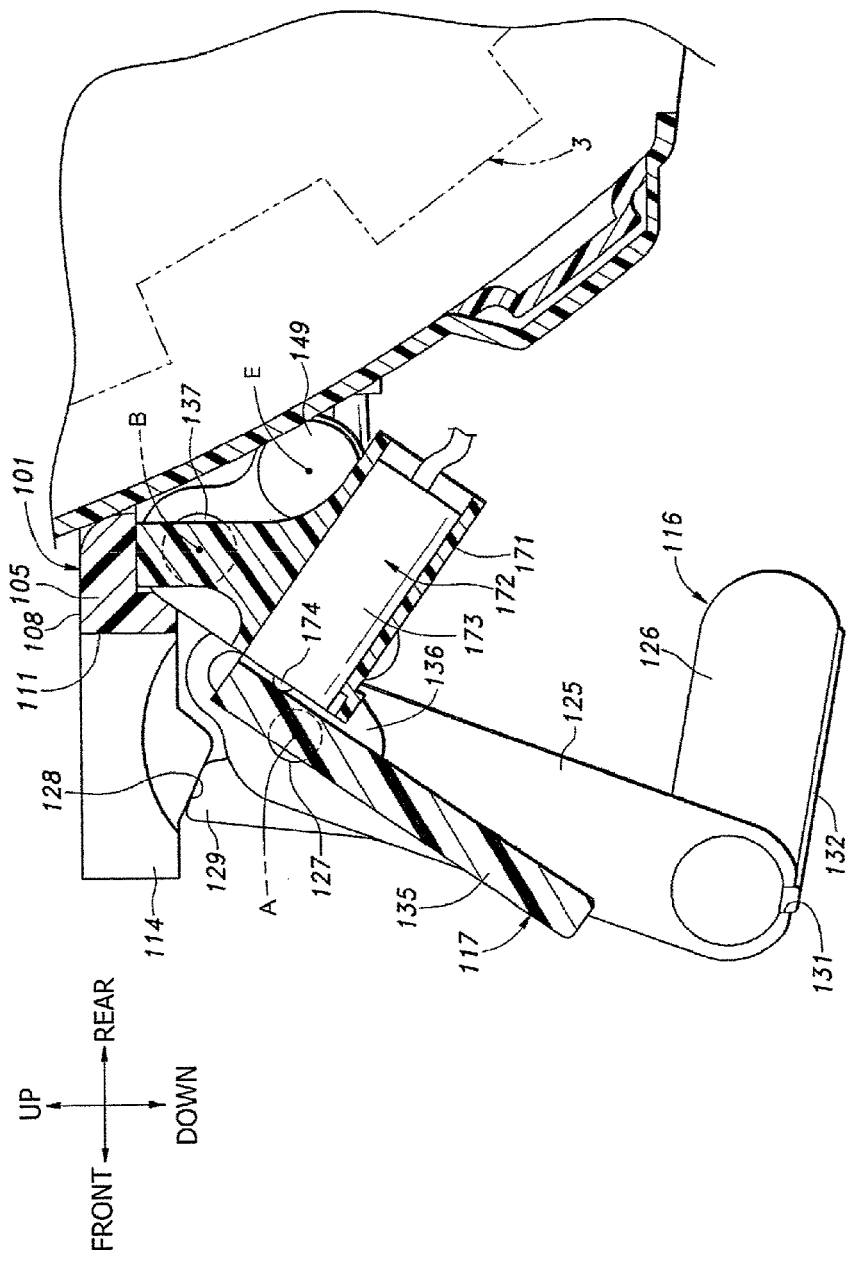
FIG. 16 is a sectional view along line XVI-XVI in FIG. 15.
Figure 17:
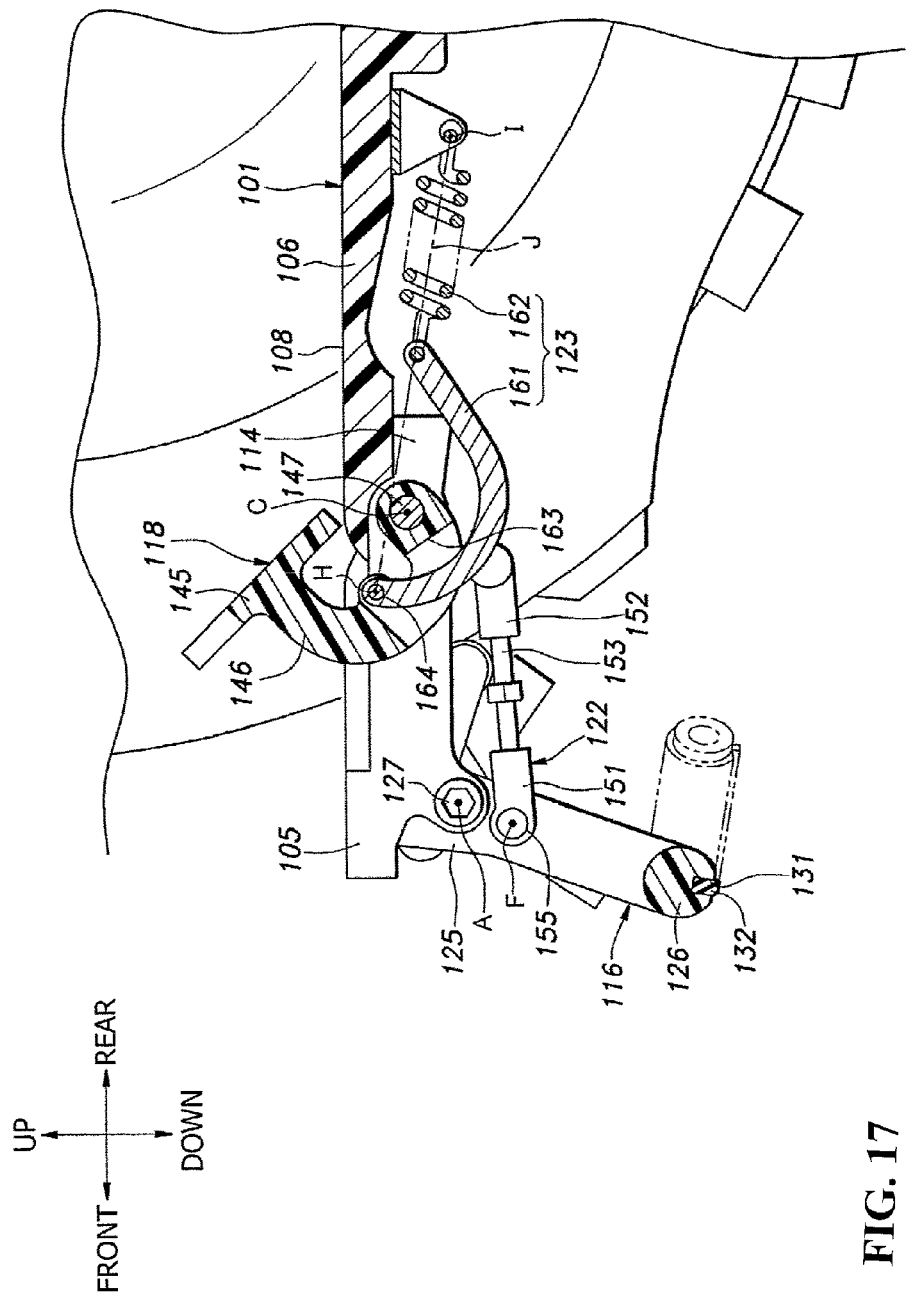
FIG. 17 is a sectional view along line XVII-XVII in FIG. 15.

FIG. 6 is a perspective view of the step unit in the housed state and FIG. 7 is a bottom view of the step unit in the housed state. FIGS. 8 to 12 are sectional views along the respective straight lines in FIG. 7. FIG. 13 is a front view of the step unit in the standing state. FIG. 14 is a perspective view of the step unit in the standing state. FIG. 15 is a bottom view of the step unit in the standing state. FIGS. 16 and 17 are sectional views along the respective straight lines in FIG. 15. As shown in FIG. 6, the step unit 35 has a footstep 101 for supporting the soles of the rider and a stand device 102 provided for the footstep 101. The stand device 102 is used to keep the inverted pendulum type vehicle 1 in the standing state when the vehicle 1 is not used and the inverted pendulum control is not carried out.

As shown in FIGS. 6 and 7, the footstep 101 has a front end part 105 extending along the left-right direction in front of the wheel cover 67 and a pair of left and right side parts 106 extending rearwardly from the left end and the right end, respectively, of the front end part 105. At the rear end parts of the left and right side parts 106, the footstep 101 is fastened to the step joined parts 33 of the left and right mount members 26 by bolts. The footstep 101 has a U-shape opened rearwardly in a plan view. The rear edge of the front end part 105, the right edge of the left side part 106, and the left edge of the right side part 106 are disposed along the outer surface of the wheel cover 67. A footrest surface 108 as the upper surface of the footstep 101 is formed so as to be a substantially horizontal surface in the state in which the inverted pendulum control is carried out. The soles of the rider are placed on the footrest surface 108 of the footstep 101. More specifically, the feet of the rider are placed on the main footrest surface parts 109 (double-dotted chain line in FIGS. 1 and 6) in the footrest surface 108 as parts located on the upper side of the left and right side parts 106.

In FIG. 5, the footstep 101 is shown with the stand device 102 omitted. As shown in FIGS. 5 and 6, at the center part of the front end part 105 of the footstep 101 in the left-right direction, a first notch 111 is formed extending rearwardly from the front edge. The first notch 111 vertically penetrates the footstep 101 and has a substantially rectangular shape in a plan view. At each of the front ends of the left and right side parts 106 of the footstep 101 (left and right end parts of the front end part 105), a second notch 112 is formed that extends rearwardly from the front edge. The second notch 112 vertically penetrates the footstep 101 and has a substantially rectangular shape in a plan view. At the parts along the left and right side edges of the second notch 112, recess parts 113 are formed as hollows forming a step with the footrest surface 108. The bottom of the recess part 113 forms a surface parallel to the footrest surface 108. At the lower part of the footstep 101, lower walls 114 protruding downwardly are formed at proper positions. The lower walls 114 support the stand device 102 and give rigidity to the footstep 101.

As shown in FIGS. 6 to 12, the stand device 102 has a pair of left and right stand arms (stands) 116, a lever (pedal) 117 for standing (hereinafter, referred to as the standing lever 117), a pair of left and right levers (pedals) 118 for housing (hereinafter, referred to as the housing lever 118), a pair of left and right first links 121, a pair of left and right second links 122, and a pair of left and right biasing devices 123.

As shown in FIGS. 6 and 7, the pair of left and right stand arms 116 is symmetric with each other in the left-right direction. The left and right stand arms 116 are disposed on the lower walls 114 at the front end part 105 of the footstep 101 in such a manner so as to sandwich the first notch 111 from the left and right sides. The left and right stand arms 116 each have a stand base part 125 that extends in a straight line manner and has a columnar shape and a ground contact part 126 provided at the tip of the stand base part 125. In the present embodiment, the ground contact part 126 extends in a direction perpendicular to the stand base part 125 and the stand arm 116 has a substantially L-shape.

Figure 11:
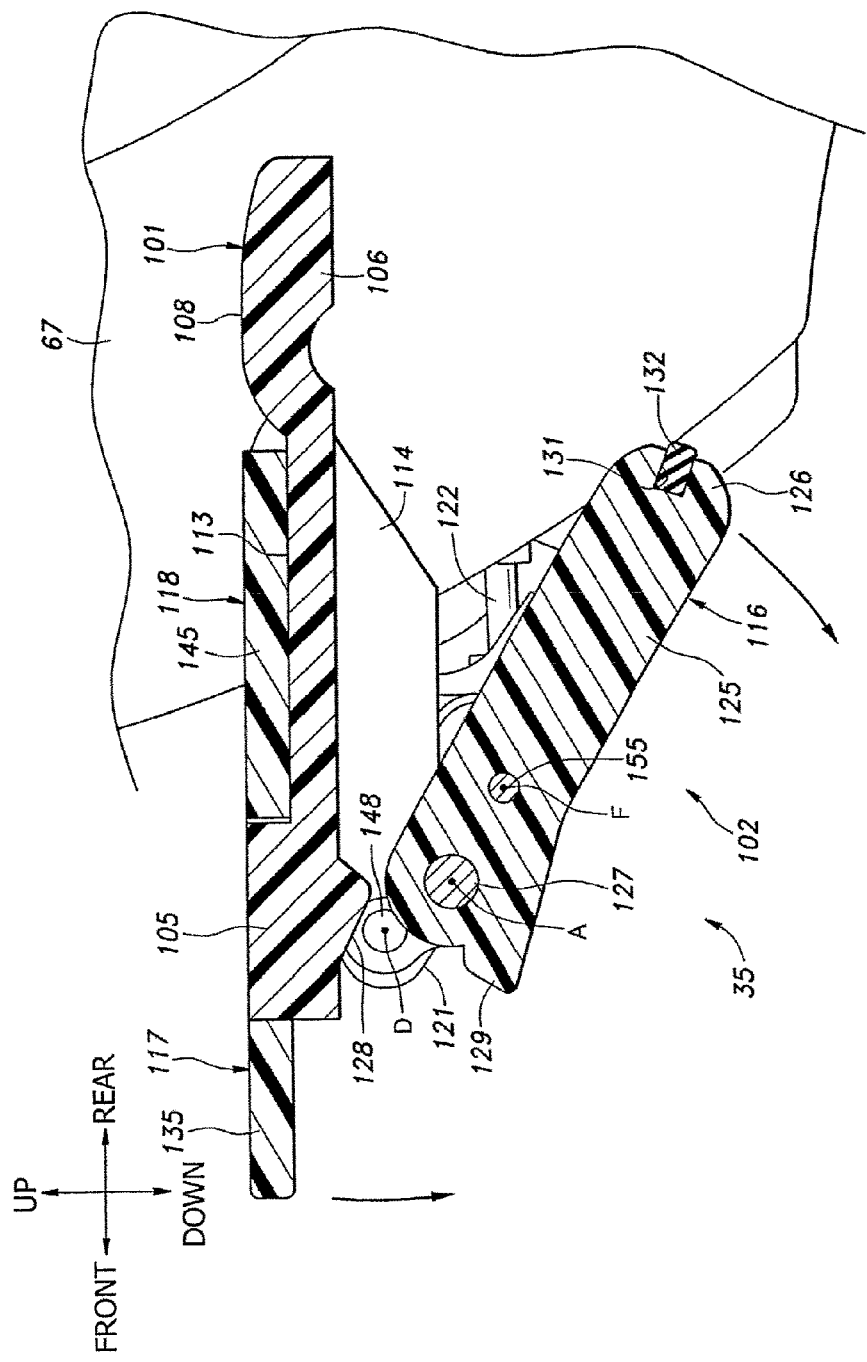
FIG. 11 is a sectional view along line XI-XI in FIG. 7.

As shown in FIGS. 6, 11, 14, and 16, the left and right stand arms 116 are supported by the lower walls 114 of the footstep 101 pivotally around a first axis line A extending along the left-right direction at the end parts of the stand base parts 125 on the opposite side to the ground contact part 126. The first axis line A is a fixed axis line that is not displaced relative to the footstep 101. More specifically, the stand base part 125 is supported by the lower wall 114 of the footstep 101 with the intermediary of a first shaft 127 centered at the first axis line A. The first shaft 127 is a bolt. It pivotally penetrates the lower wall 114 and is screwed to the stand base part 125 at its tip part. In the state in which the left and right stand arms 116 are supported by the footstep 101, the ground contact parts 126 of the left and right stand arms 116 extend in such a direction so as to extend away from each other (outward in the left-right direction). The left and right stand arms 116 can pivot between a housing position (see FIG. 6) at which the ground contact part 126 is disposed rearwardly of the first axis line A and a standing position (see FIG. 16) at which the part of the stand base part 125 close to the ground contact part 126 is disposed forward and downwardly of the first axis line A. As shown in FIGS. 11 and 16, in the stand base part 125, a stopper projection 129 protrudes that abuts against an abutting stopper 128 as the lower surface of the footstep 101 when the stand arm 116 exists at the standing position. More specifically, due to the abutting of the stopper projection 129 against the lower surface of the footstep 101, the pivot range of the stand arm 116 is restricted and the standing position is defined.

At the part located as the lowermost part of the ground contact part 126 when the stand arm 116 exists at the standing position, an engagement groove 131 is formed that extends along the longitudinal direction of the ground contact part 126. To the engagement groove 131, a resin member 132 of e.g. nylon is fitted and fixed by a screw or the like. Part of the resin member 132 protrudes outward from the engagement groove 131. Due to this, when the stand arm 116 is grounded, the resin member 132 comes into contact with the floor surface.

Figure 9:
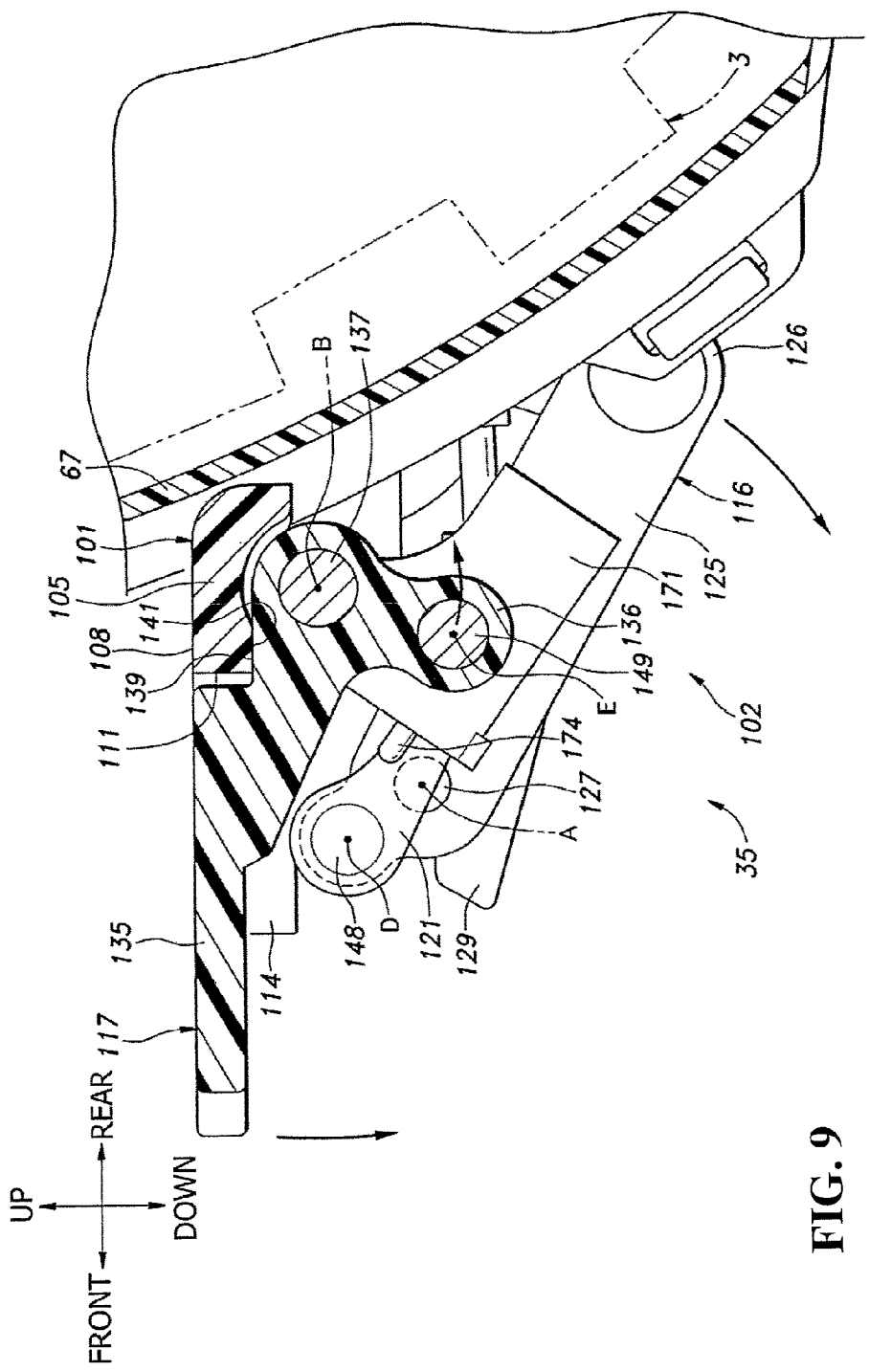
FIG. 9 is a sectional view along line IX-IX in FIG. 7.

As shown in FIGS. 6 and 7, the standing lever 117 is disposed in the first notch 111. As shown in FIG. 9, the standing lever 117 has a plate-shaped tread part 135 and a pair of left and right arm parts 136 protruding on the lower surface of the tread part 135. Each arm part 136 protrudes from the lower surface of the tread in parallel to the tread rearwardly beyond the rear edge of the tread, and thereafter forms a bent part to extend in the direction perpendicular to the lower surface of the tread. At the bent parts of the left and right arm parts 136, the standing lever 117 is supported by the lower walls 114 of the footstep 101 pivotally around a second axis line B extending along the left-right direction. The second axis line B is a fixed axis line that is not displaced relative to the footstep 101. It is located rearward of the first axis line A and is located rearward of the rear edge of the first notch 111. More specifically, the left and right arm parts 136 of the standing lever 117 are supported by the lower wall 114 of the footstep 101 with the intermediary of a second shaft 137 centered at the second axis line B. The second shaft 137 is a bolt. It pivotally penetrates the arm part 136 and is screwed to the lower wall 114 at its tip part.

As shown in FIG. 9, in both arm parts 136 of the standing lever 117, a side part ranging from the part joined to the tread part 135 to the bent part forms a pedal-side stopper part 139 parallel to the upper surface of the tread. Meanwhile, the lower part of the rear edge part of the first notch 111 in the footstep 101 forms a step-side stopper part 141. One end of the pivot range of the standing lever 117 is defined due to abutting of the pedal-side stopper part 139 and the step-side stopper part 141. When the pedal-side stopper part 139 abuts against the step-side stopper part 141, the upper surface of the tread part 135 of the standing lever 117 is flush with the footrest surface 108 of the footstep 101. The position of the standing lever 117 at this time will be referred to as the first position (see FIGS. 6 and 9). The standing lever 117 can pivot between the first position and a second position (see FIGS. 14 and 16) at which the tread part 135 is located below the first notch 111.

As shown in FIGS. 6 and 14, the housing levers 118 are disposed in the second notches 112. As shown in FIGS. 12 and 17, the housing lever 118 has a plate-shaped tread part 145 and an arm part 146 protruding on the lower surface of the tread part 145. The arm part 146 of the housing lever 118 extends rearwardly from the lower surface of the tread part 145 with an arc-shaped curvature. Each housing lever 118 is supported by the lower wall 114 of the footstep 101 at the tip part of the arm part 146 pivotally around a third axis line C extending along the left-right direction. The third axis line C is a fixed axis line that is not displaced relative to the footstep 101 and is located rearwardly of the rear edge of the second notch 112. More specifically, the arm part 146 of each housing lever 118 is supported by the lower wall 114 of the footstep 101 with the intermediary of a third shaft 147 centered at the third axis line C. The third shaft 147 is a bolt. It pivotally penetrates the arm part 146 and is screwed to the lower wall 114 at its tip part.

The housing lever 118 can pivot between a third position (see FIGS. 6 and 12) at which the upper surface of the tread part 145 is flush with the footrest surface 108 of the footstep 101 and a fourth position (see FIGS. 14 and 17) at which the tread part 145 is located upwardly of the footrest surface 108 of the footstep 101. The tread part 145 of the housing lever 118 is larger than the second notch 112. Therefore, at the third position, the tread part 145 extends into the recess parts 113 provided on the left and right sides of the second notch 112. As shown in FIG. 11, the lower surface of the tread part 145 abuts against the bottom of the recess part 113. This restricts the third position of the housing lever 118. Because the recess parts 113 are made and the tread part 145 of the housing lever 118 is disposed in the recess parts 113, the upper surface of the tread part 145 is disposed so as to be flush with the footrest surface 108 at the third position. As shown in FIGS. 1 and 6, when the housing lever 118 exists at the third position, the main footrest surface part 109 is formed as a flush surface by the upper surface of the tread part 145 and the footrest surface 108 of the footstep 101.

Figure 10:
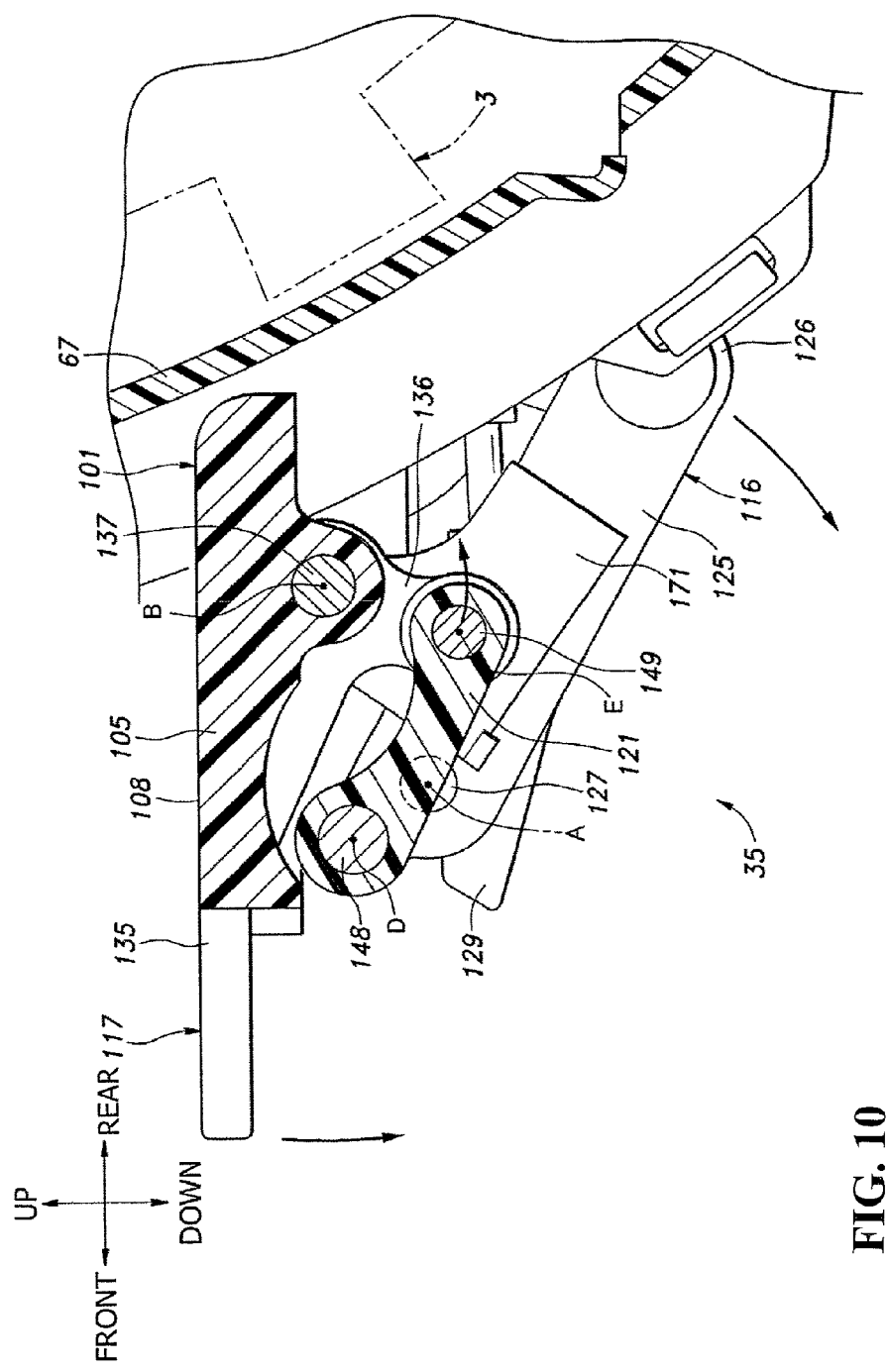
FIG. 10 is a sectional view along line X-X in FIG. 7.

As shown in FIGS. 7 and 10, the first links 121 are provided as a pair of left and right components. The left first link 121 connects the left stand arm 116 to the left arm part 136 of the standing lever 117 and the right first link 121 connects the right stand arm 116 to the right arm part 136 of the standing lever 117. The left and right first links 121 are each connected to the stand base part 125 of the stand arm 116 at one end pivotally around a fourth axis line D extending along the left-right direction, and connected to the tip part of the arm part 136 at the other end pivotally around a fifth axis line E extending along the left-right direction. The fourth axis line D is an axis line that rotates around the first axis line A and the fifth axis line E is an axis line that rotates around the second axis line B. When the stand arm 116 exists at the housing position, the fourth axis line D is disposed above the first axis line A and the fifth axis line E is disposed below the second axis line B.

The first link 121 is connected to the stand base part 125 with the intermediary of a fourth shaft 148 centered at the fourth axis line D. The fourth shaft 148 is a bolt. It pivotally penetrates the first link 121 and is screwed to the stand base part 125 at its tip part. Furthermore, the first link 121 is connected to the arm part 136 of the standing lever 117 with the intermediary of a fifth shaft 149 centered at the fifth axis line E. The fifth shaft 149 is a bolt. It pivotally penetrates the arm part 136 and is screwed to the first link 121 at its tip part.

As shown in FIG. 7, the second links 122 are provided as a pair of left and right components. The left second link 122 connects the left stand arm 116 to the arm part 146 of the left housing lever 118 and the right second link 122 connects the right stand arm 116 to the arm part 146 of the right housing lever 118. As shown in FIGS. 12 and 17, the left and right second links 122 are each connected to the stand base part 125 of the stand arm 116 at one end pivotally around a sixth axis line F extending along the left-right direction, and connected to the arm part 146 of the housing lever 118 at the other end pivotally around a seventh axis line G extending along the left-right direction. The sixth axis line F is an axis line that rotates around the first axis line A and the seventh axis line G is an axis line that rotates around the third axis line C. The sixth axis line F is disposed at a longitudinally intermediate part of the stand base part 125 of the stand arm 116 and the seventh axis line G is disposed at a longitudinally intermediate part of the arm part 146 of the housing lever 118.

The second link 122 has a first end member 151 pivotally connected to the stand base part 125, a second end member 152 pivotally connected to the arm part 146, and a connecting shaft 153 connected to the first end member 151 and the second end member 152. The connecting shaft 153 has male screw parts (not shown) at both end parts and is screwed to female screw holes (not shown) formed in the first end member 151 and the second end member 152. The length of the second link 122 can be changed by rotating the connecting shaft 153 to change the length of the screwing thereof into the first end member 151 and the second end member 152.

The second link 122 is connected to the stand base part 125 with the intermediary of a sixth shaft 155 centered at the sixth axis line F. The sixth shaft 155 is a bolt. It pivotally penetrates the first end member 151 of the second link 122 and is screwed to the stand base part 125 at its tip part (see FIG. 11). Furthermore, the second link 122 is connected to the arm part 146 of the housing lever 118 with the intermediary of a seventh shaft 156 centered at the seventh axis line G. The seventh shaft 156 is a bolt. It pivotally penetrates the second end member 152 of the second link 122 and is screwed to the arm part 146 of the housing lever 118 at its tip part.

As shown in FIGS. 7 and 12, the pair of left and right biasing devices 123 each have a third link 161 curved into a semicircular arc shape and a spring 162 that is a helical tension spring connected to one end of the third link 161. In the arm part 146 of the housing lever 118, an insertion hole 163 penetrating from the inside of the curvature to the outside is formed. The insertion hole 163 is formed at substantially the center part of the arm part 146 in the left-right direction. The other end of the third link 161 passes through the insertion hole 163 from the outside to the inside and is connected to the curved inside part of the arm part 146 pivotally around an eighth axis line H extending along the left-right direction. The eighth axis line H rotates around the third axis line C. The third link 161 is supported by the arm part 146 of the housing lever 118 with the intermediary of an eighth axis 164 centered at the eighth axis line H. The eighth axis 164 is a pin. It pivotally penetrates the third link 161 and both end parts thereof are press-fitted into the arm part 146 of the housing lever 118.

The other end of the spring 162 on the opposite side to the third link 161 is hooked to a locking part 166 that is a bracket joined to the lower wall 114 of the footstep 101 and the spring 162 can pivot around a ninth axis line I extending along the left-right direction. If the line segment linking the eighth axis line H and the ninth axis line I is defined as a line segment J, the positions of the eighth axis line H and the ninth axis line I are set so as to satisfy the following positional relationships. More specifically, the line segment J is located below the third axis line C when the housing lever 118 exists at the third position as shown in FIG. 12. Furthermore, the line segment J is located above the third axis line C when the housing lever 118 exists at the fourth position as shown in FIG. 17. Due to this, the biasing device 123 biases the housing lever 118 toward the third position side when the housing lever 118 exists on the third position side in the pivot range and biases the housing lever 118 toward the fourth position side when the housing lever 118 exists on the fourth position side in the pivot range. More specifically, by being biased by the biasing device 123, the housing lever 118 is kept at the third position or fourth position.

Figure 8:
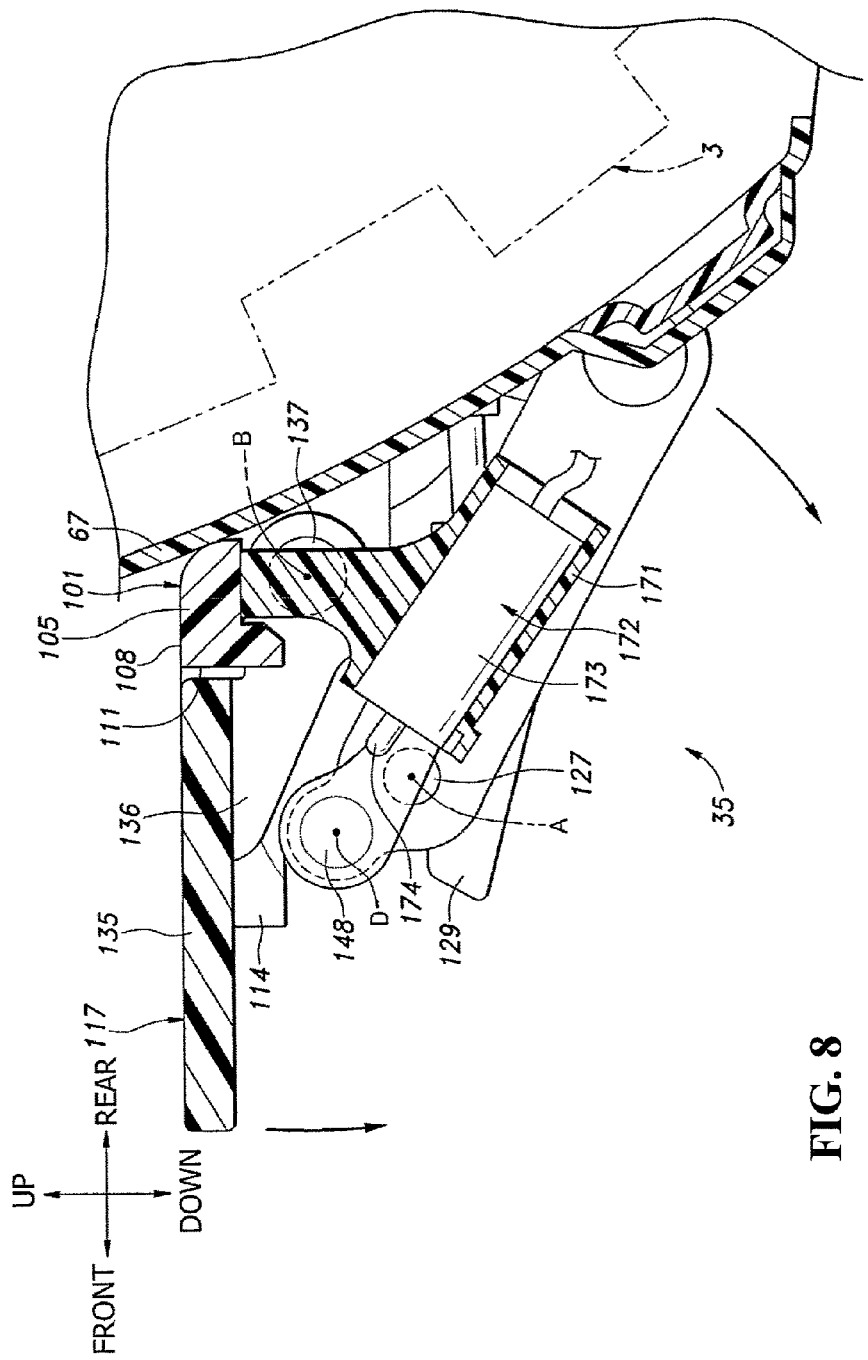
FIG. 8 is a sectional view along line VIII-VIII in FIG. 7.

As shown in FIGS. 6 to 8, on the lower side of the front end part 105 of the footstep 101, a sensor supporter 171 joined to the lower part of the front end part 105 and a position sensor 172 inserted and supported in a tubular part of the sensor supporter 171 are provided. The position sensor 172 detects the position of the standing lever 117 and outputs a signal according to the position of the standing lever 117 to the I/O interface of the electric equipment unit 8. The position sensor 172 has a housing 173 and a plunger 174 that is provided so as to be capable of advancing and retreating relative to the housing 173 and is biased in the protrusion direction by biasing means (not shown). The position sensor 172 outputs a signal according to the position of the plunger 174 relative to the housing 173. When the standing lever 117 exists at the first position, the plunger 174 is separate from the tread of the standing lever 117. When the standing lever 117 exists at the second position, the plunger 174 is pushed by the tread of the standing lever 117 to sink into the housing 173.

It is preferable that, in control by the electric equipment unit 8, the inverted pendulum control is not carried out in the state in which the standing lever 117 exists at the second position, i.e. the state in which the stand arm 116 exists at the standing position, based on the signal from the position sensor 172. If this is employed, the inverted pendulum control is not started even if the switch button 93 is accidentally operated when the stand arm 116 exists at the standing position.

In the stand device 102 formed in the above-described manner, as shown in FIGS. 6 to 12, the left and right stand arms 116 connected to the standing lever 117 by the left and right first links 121 are located at the housing position when the standing lever 117 exists at the first position. Furthermore, the left and right housing levers 118 connected to the left and right stand arms 116 by the left and right second links 122 are located at the third position. At this time, the housing levers 118 are biased to the third position by the biasing devices 123. Thus, the left and right stand arms 116 are kept at the housing position and the standing lever 117 is kept at the first position.

When the tread of the standing lever 117 is pushed downward (depressed) by a toe or the like from this state, the standing lever 117 pivots around the second axis line B against the biasing force of the biasing devices 123. This moves the fifth shafts 149 (fifth axis line E) rearwardly and moves the first links 121 rearwardly. In association with the rearward movement of the first links 121, the left and right stand arms 116 pivot toward the standing position around the first axis line A. The left and right stand arms 116 pivot until the stopper projections 129 abuts against the abutting stopper 128 and are located at the standing position (see FIGS. 13 to 17). When the inverted pendulum type vehicle 1 is in a predetermined standing state, the ground contact parts 126 of the stand arms 116 do not come into contact with the floor surface in the process of the pivot.

When the stand arms 116 pivot from the housing position to the standing position, the sixth shafts 155 (sixth axis line F) move forward according to the pivot of the stand arms 116 and therefore the second links 122 move forward. In association with the forward movement of the second links 122, the housing levers 118 connected to the second links 122 with the intermediary of the seventh shafts 156 pivot from the third position to the fourth position around the third axis line C. The housing levers 118 pivot until the stopper projections 129 abuts against the abutting stopper 128 and are located at the fourth position. When the housing levers 118 are located at the fourth position, the biasing devices 123 bias the housing levers 118 toward the fourth position and therefore the housing levers 118 are kept at the fourth position. Furthermore, the stand arms 116 are kept at the standing position and the standing lever 117 is kept at the second position (see FIGS. 6 to 12).

In the case of moving the stand arms 116 from the standing position to the housing position, either of the left and right housing levers 118 is pushed down (depressed) by a foot or the like against the biasing force of the biasing device 123. The depressed housing lever 118 pivots from the fourth position to the third position around the third axis line C. At this time, the tread part 145 of the housing lever 118 abuts against the bottoms of the recess parts 113, which prevents the housing lever 118 from pivoting beyond the fourth position. In association with the pivot of the housing lever 118, the second link 122 moves rearward and the stand arm 116 pivots from the standing position to the housing position around the first axis line A. At this time, the first link 121 moves forward according to the pivot of the stand arm 116 and the standing lever 117 pivots from the second position to the first position around the second axis line B. The pedal-side stopper part 139 abuts against the step-side stopper part 141 at the first position, which prevents the standing lever 117 from pivoting beyond the first position (see FIG. 9).

Due to the pivot of the standing lever 117, the stand arm 116 on the opposite side to the depressed side pivots from the standing position to the housing position around the first axis line A. Furthermore, by the second link 122, the housing lever 118 on the opposite side to the depressed side pivots from the fourth position to the third position around the third axis line C.

The travel operation of the inverted pendulum type vehicle 1 will be described. The main wheel PDU calculates, as needed, the centroid position of the whole of the inverted pendulum type vehicle 1 including a rider who sits on the saddle unit 11 from a change in the inclination angle and angular velocity of the vehicle body frame 2 in the front-rear and left-right directions, measured by the gyro sensor 91.

When the centroid of the whole of the inverted pendulum type vehicle 1 including the rider exists at the neutral position (e.g. above the axle 25), the main wheel PDU drives the electric motor 61 of the drive unit 7 based on control processing in accordance with the inverted pendulum control rule to keep the vehicle body frame 2 in an upright posture.

At this time, the tail wheel PDU keeps the electric motor 73 of the tail wheel unit 6 in the stopped state based on control processing in accordance with the turning control rule, so that the tail wheel 5 does not rotate.

When the centroid of the whole of the inverted pendulum type vehicle 1 including the rider has moved closer to the front side than the neutral position, the main wheel PDU drives each of the electric motors 61 of the drive unit 7 in the forward direction at the same speed under control processing in accordance with the inverted pendulum control rule. By the driving of the electric motors 61, the left and right drive disks 50 rotate forward at the same speed and the main wheel 3 rotates forward, i.e. revolves in the forward movement direction, with the rotation axis being the wheel center of the main wheel 3. At this time, because no rotational speed difference is generated between the left and right drive disks 50, the drive rollers 58 of the drive disks 50 and the driven rollers 54 of the main wheel 3 do not spin and the inverted pendulum type vehicle 1 moves straight forward.

When the centroid of the whole of the inverted pendulum type vehicle 1 including the rider has moved closer to the rear side than the neutral position, the main wheel PDU drives each of the electric motors 61 of the drive unit 7 in the reverse direction at the same speed under control processing in accordance with the inverted pendulum control rule. By the driving of the electric motors 61, the left and right drive disks 50 reversely rotate at the same speed and the main wheel 3 reversely rotates, i.e. revolves in the rearward movement direction, with the rotation axis being the wheel center of the main wheel 3. At this time, because no rotational speed difference is generated between the left and right drive disks 50, the drive rollers 58 of the drive disks 50 and the driven rollers 54 of the main wheel 3 do not spin and the inverted pendulum type vehicle 1 moves straight rearward.

In the forward movement and rearward movement, the tail wheel PDU keeps the stopped state of the electric motor 73 of the tail wheel unit 6 under control processing in accordance with the turning control rule, so that the tail wheel 5 does not revolve. At this time, the free roller 78 of the tail wheel 5 spins in association with the forward movement of the inverted pendulum type vehicle 1.

When the centroid of the whole of the inverted pendulum type vehicle 1 including the rider has moved closer to the left side or right side than the neutral position, the main wheel PDU drives the electric motors 61 of the drive unit 7 in rotation directions different from each other or at rotational speeds different from each other under control processing in accordance with the inverted pendulum control rule. A rotational speed difference is generated between the left and right drive disks 50 by the driving of the electric motors 61. Thus, a component force of the orientation orthogonal to the force in the circumferential (tangent) direction of the left and right drive disks 50 based on the rotational force of the drive disks 50 acts on the contact surfaces between the left and right drive rollers 58 and the driven rollers 54 of the main wheel 3. This component force makes the driven rollers 54 rotate (spin) around their own center axis lines.

The rotation of the driven rollers 54 is determined depending on the rotational speed difference between the left and right drive disks 50. For example, when the left and right drive disks 50 are rotated at the same speed in directions opposite to each other, the main wheel 3 does not revolve at all and only the spin of the driven rollers 54 is caused. Due to this, a traveling force in the left-right direction is applied to the main wheel 3 and the inverted pendulum type vehicle 1 moves in the left-right direction (straight lateral movement). When the left and right drive disks 50 are rotated in the same direction at different speeds, the spin of the driven rollers 54 is caused in addition to the revolution of the main wheel 3. This makes the inverted pendulum type vehicle 1 move obliquely forward or obliquely rearward.

At this time, the tail wheel PDU may drive the electric motor 73 of the tail wheel unit 6 based on control processing in accordance with the turning control rule to rotate (revolve) the tail wheel 5 at a rotational speed equivalent to the straight lateral movement speed. If a difference is generated between the amount of movement by the rotation of the driven rollers 54 of the main wheel 3 and the amount of movement by the rotation of the tail wheel 5, the inverted pendulum type vehicle 1 turns.

Figure 18:
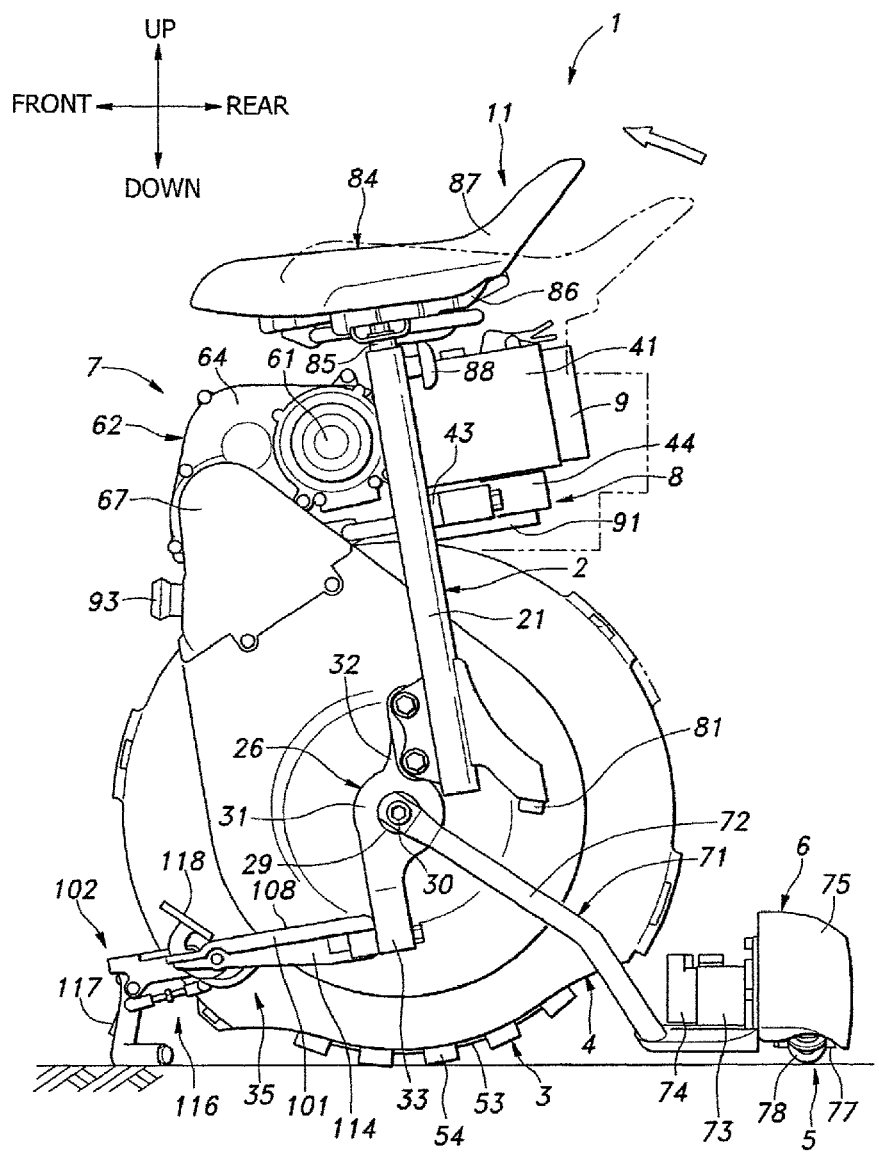
FIG. 18 is a side view of the inverted pendulum type vehicle in a parked state.

FIG. 18 is a side view of the inverted pendulum type vehicle 1 in a parked state. As shown in FIG. 18, the inverted pendulum type vehicle 1 in which the inverted pendulum control is deactivated (turned off) is kept in the state in which the vehicle body frame 2 is leaned forward by the stand arms 116 existing at the standing position. In this state, the ground contact parts 126 of the stand arms 116 abut against the floor surface and thereby the posture of the vehicle body frame 2 connected with the intermediary of the footstep 101 relative to the floor surface is kept. This state is defined as the stopped posture. In the stopped posture, the standing lever 117 exists at the second position and the housing levers 118 exist at the fourth position.

One example of a method for activating the inverted pendulum type vehicle 1 in the stopped posture and mounting the vehicle will be described below. First, the rider raises the forward-leaned inverted pendulum type vehicle 1 like that shown in FIG. 18 rearward to make the posture shown in FIG. 2 so that the left and right side posts 21 may extend substantially vertically. This separates the ground contact parts 126 of the stand arms 116 from the floor surface. Next, the rider sits on the saddle 84 with both feet maintained in contact with the floor surface. From this state, the rider puts the sole of either the left or right foot on the footrest surface 108 of the footstep 101 and pushes down (depresses) either the left or right housing lever 118. Thereby, the stand arms 116 move to the housing position and the standing lever 117 moves to the first position. Next, the rider operates the switch button 93 to activate the inverted pendulum type vehicle 1 to start the inverted pendulum control. After the start of the inverted pendulum control, the rider may place his/her foot in contact with the floor surface thus far onto the footstep 101.

One example of a method for getting off the inverted pendulum type vehicle 1 in which the inverted pendulum control is being carried out will be described below. First, the rider brings at least one foot into contact with the floor surface and operates the switch button 93 to deactivate the inverted pendulum control. In this state, the rider supports the inverted pendulum type vehicle 1 by the rider's own foot to keep the posture. Next, the rider pushes down (depresses) the standing lever 117 by one toe to rotate the standing lever 117 from the first position to the second position and rotate the stand arms 116 from the housing position to the standing position. Next, the rider leans the vehicle body frame 2 forward to bring the ground contact parts 126 of the stand arms 116 into contact with the floor surface. Thereby, the inverted pendulum type vehicle 1 is kept in the stopped posture.

Effects of the inverted pendulum type vehicle 1 formed in the above-described manner will be described. The standing lever 117 is disposed at the front end part 105 of the footstep 101, i.e. inside in the vehicle width direction and in front of the main wheel 3. This prevents the rider from accidentally depressing the standing lever 117 when riding the vehicle 1. Furthermore, in the operation of the standing lever 117, it needs to be depressed (pressed down) to a position lower than the footrest surface 108 of the footstep 101. Thus, accidental depression of the standing lever 117 by the rider when the rider is riding the vehicle 1 is suppressed.

The housing levers 118 are provided as a pair of left and right components and operation of either one housing lever 118 can rotate the stand arms 116 and the other housing lever 118, which provides favorable operability. Furthermore, when the stand arms 116 exist at the housing position, the housing levers 118 exist at the third position and thus are in the inoperable state. Thus, there is no possibility that an erroneous operation is carried out. Moreover, at the third position, the upper surfaces of the tread parts 145 of the housing levers 118 are flush with the footrest surface 108 of the footstep 101 and thus the housing levers 118 can function as part of the footstep 101. In addition, when the stand arms 116 is moved to the standing position, the housing levers 118 exist at the fourth position and the treads thereof are disposed so as to protrude upward of the footrest surface 108 of the footstep 101. Therefore, the depression operation is easy.

The resin member 132 is provided at the ground contact part 126 of the stand arm 116 so that the ground contact part 126 may get contact with the floor surface at the resin member 132. Therefore, the resin member 132 is brought into tight contact with the floor surface and the slip between the ground contact part 126 and the floor surface is suppressed. Furthermore, generation of scratches due to the contact between the ground contact part 126 and the floor surface is prevented.

In control by the electric equipment unit 8, the inverted pendulum control is not started even when the switch button 93 is operated in the state in which the standing lever 117 exists at the second position, i.e. the state in which the stand arms 116 exist at the standing position, based on a signal from the position sensor 172. This prevents erroneous control of the inverted pendulum control attributed to the contact between the stand arms 116 and the floor surface, which further enhances the safety. Furthermore, a configuration may be employed in which the inverted pendulum control is deactivated if the stand arms 116 are displaced from the housing position toward the standing position while the inverted pendulum control is being carried out.

Although the present invention is described above about the preferred embodiment thereof, the present invention is not limited by such an embodiment and changes can be arbitrarily made without departing from the gist of the present invention, as can be easily understood by those skilled in the art. For example, in the above-described embodiment, the first shaft 127 and so forth are formed of bolts. However, pins may be inserted instead of the bolts or the first shaft 127 may be formed monolithically with the stand arm 116 and so forth.

The shapes of the stand arm 116, the standing lever 117, and the housing lever 118 are examples and can be arbitrarily changed depending on the purpose of the use. Furthermore, although the configuration in which the biasing device 123 directly biases the housing lever 118 is employed in the embodiment, a configuration may be employed in which the biasing device 123 directly biases the stand arm 116, the standing lever 117, the first link 121, or another component. Moreover, in the embodiment, the position sensor 172 detects the position of the standing lever 117 to thereby detect the position of the stand arm 116. However, the position sensor 172 may directly detect the position of the stand arm 116 or the position sensor 172 may detect the position of the housing lever 118 or the first, second, or third link 121, 122, or 161 to thereby detect the position of the stand arm 116.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverted pendulum vehicle including a vehicle body frame including a step on which to position a rider's feet, a main wheel provided on the vehicle body frame and is subjected to an inverted pendulum control, and a stand provided on the vehicle body frame pivotally between a standing position and a housing position for supporting the vehicle body frame in a standing state when the inverted pendulum control is not being carried out and the stand exists at the standing position, the inverted pendulum type vehicle comprising:
    a housing lever provided on the vehicle body frame for pivoting the stand from the standing position to the housing position;
    wherein the housing lever protrudes upwardly from a footrest surface of the step when the stand is positioned at the standing position, and pivots the stand to the housing position by being pushed down to the side of the footrest surface.

2. The inverted pendulum vehicle according to claim 1, further comprising:
    a standing lever provided on the vehicle body frame for pivoting the stand from the housing position to the standing position;
    wherein the standing lever is disposed closer to the inside in a vehicle width direction than the footrest surface of the step.

3. The inverted pendulum vehicle according to claim 2, wherein the standing lever pivots the stand from the housing position to the standing position by being pushed down to a position lower than the footrest surface.

4. The inverted pendulum vehicle according to claim 2,
    wherein the vehicle body frame has an axle support member for supporting an axle of the main wheel;
    the step is supported by the axle support member and extends from left and right side parts of the main wheel to a front side of the main wheel; and
    the stand is pivotally supported by a front end part of the step.

5. The inverted pendulum vehicle according to claim 3,
    wherein the vehicle body frame has an axle support member for supporting an axle of the main wheel;
    the step is supported by the axle support member and extends from left and right side parts of the main wheel to a front side of the main wheel; and
    the stand is pivotally supported by a front end part of the step.

6. The inverted pendulum vehicle according to claim 2, wherein the standing lever and the housing lever are pivotally supported by the step.

7. The inverted pendulum vehicle according to claim 3, wherein the standing lever and the housing lever are pivotally supported by the step.

8. The inverted pendulum vehicle according to claim 4, wherein the standing lever and the housing lever are pivotally supported by the step.

9. The inverted pendulum vehicle according to claim 2, wherein the housing levers are disposed on left and right lateral sides of the main wheel; and
the standing lever is disposed in front of the main wheel.

10. The inverted pendulum vehicle according to claim 3, wherein the housing levers are disposed on left and right lateral sides of the main wheel; and
the standing lever is disposed in front of the main wheel.

11. The inverted pendulum vehicle according to claim 4, wherein the housing levers are disposed on left and right lateral sides of the main wheel; and
the standing lever is disposed in front of the main wheel.

12. The inverted pendulum vehicle according to claim 6, wherein the housing levers are disposed on left and right lateral sides of the main wheel; and
the standing lever is disposed in front of the main wheel.

13. The inverted pendulum vehicle according to claim 2, wherein the standing lever has a surface flush with the footrest surface when the stand is positioned at the housing position; and
the housing lever has a surface flush with the footrest surface when the stand is positioned at the housing position.

14. The inverted pendulum vehicle according to claim 3, wherein the standing lever has a surface flush with the footrest surface when the stand is positioned at the housing position; and
the housing lever has a surface flush with the footrest surface when the stand is positioned at the housing position.

15. The inverted pendulum vehicle according to claim 4, wherein the standing lever has a surface flush with the footrest surface when the stand is positioned at the housing position; and
the housing lever has a surface flush with the footrest surface when the stand is positioned at the housing position.

16. The inverted pendulum vehicle according to claim 2, comprising:
a position sensor that detects a displacement position of at least one of the stand, the standing lever, and the housing lever,
wherein a position of the stand is detected based on a signal from the position sensor and the inverted pendulum control is inhibited when the stand is positioned at the standing position.

17. The inverted pendulum vehicle according to claim 3, comprising:
a position sensor that detects a displacement position of at least one of the stand, the standing lever, and the housing lever,
wherein a position of the stand is detected based on a signal from the position sensor and the inverted pendulum control is inhibited when the stand is positioned at the standing position.

18. An inverted pendulum vehicle comprising:
a vehicle body frame including a step on which to position a rider's feet;
a main wheel provided on the vehicle body frame and being subjected to an inverted pendulum control;
a stand pivotally mounted on the vehicle body frame between a standing position and a housing position for supporting the vehicle body frame in a standing state when the inverted pendulum control is not being carried out and the stand is positioned at the standing position;
a housing lever provided on the vehicle body frame for pivoting the stand from the standing position to the housing position, said housing lever protruding upwardly from a footrest surface of the step when the stand is positioned at the standing position, and pivots the stand to the housing position by being pushed down to the side of the footrest surface, said housing lever including a surface flush with the footrest surface when the stand is positioned at the housing position;
a standing lever provided on the vehicle body for pivoting the stand from the housing position to the standing position, said standing lever having a surface flush with the footrest surface when the stand is positioned at the housing position; and
a position sensor for detecting a displacement position of at least one of the stand, the standing lever, and the housing lever, wherein a position of the stand is detected based on a signal from the position sensor and the inverted pendulum control is inhibited when the stand is positioned at the standing position.

19. The inverted pendulum vehicle according to claim 18, wherein the standing lever pivots the stand from the housing position to the standing position by being pushed down to a position lower than the footrest surface.

20. The inverted pendulum vehicle according to claim 18, wherein the vehicle body frame has an axle support member for supporting an axle of the main wheel;
the step is supported by the axle support member and extends from left and right side parts of the main wheel to a front side of the main wheel; and
the stand is pivotally supported by a front end part of the step.

* * * * *